(12) United States Patent
Liu et al.

(10) Patent No.: US 8,151,433 B2
(45) Date of Patent: Apr. 10, 2012

(54) METHOD OF MAKING DISC BRAKE PADS

(75) Inventors: Weiming Liu, Windsor (CA); Rodney G. Silvey, Cookeville, TN (US); Jason Heath Mahan, Lafayette, TN (US)

(73) Assignee: Federal-Mogul Products, Inc., Southfield, MI (US)

( * ) Notice: Subject to any disclaimer, the term of this patent is extended or adjusted under 35 U.S.C. 154(b) by 876 days.

(21) Appl. No.: 12/184,455

(22) Filed: Aug. 1, 2008

(65) Prior Publication Data
US 2009/0031550 A1 Feb. 5, 2009

Related U.S. Application Data

(60) Provisional application No. 60/953,333, filed on Aug. 1, 2007.

(51) Int. Cl.
B21D 39/00 (2006.01)
F16D 65/04 (2006.01)
(52) U.S. Cl. ............... 29/527.1; 188/250 B; 188/250 H
(58) Field of Classification Search ............... 29/527.1; 188/218 XL, 250 B, 250 H, 261
See application file for complete search history.

(56) References Cited

U.S. PATENT DOCUMENTS

| | | | |
|---|---|---|---|
| 4,173,681 A | 11/1979 | Durrieu et al. | |
| 4,200,173 A | 4/1980 | Evans et al. | |
| 4,220,223 A | 9/1980 | Rinker et al. | |
| 4,705,146 A | 11/1987 | Tarter | |
| 4,993,520 A | 2/1991 | Goddard et al. | |
| 5,145,037 A | 9/1992 | Kobayashi et al. | |
| 5,413,194 A | 5/1995 | Kulis, Jr. et al. | |
| 5,443,133 A | 8/1995 | Dreilich et al. | |
| 5,456,339 A | 10/1995 | Zeng | |
| 5,535,859 A | 7/1996 | Zeng | |
| 5,561,895 A | 10/1996 | Clark | |
| 5,564,533 A | 10/1996 | Parsons | |
| 5,730,257 A | 3/1998 | Clark | |

(Continued)

FOREIGN PATENT DOCUMENTS

EP 0443360 A1 8/1991

(Continued)

OTHER PUBLICATIONS

Kung, Dunlap, Ballinger, Complex Eigenvalue Analysis for Reducing Low Frequency Brake Sequal, SAE 2000 World Congress, SAE Paper No. 2000-01-0444.

*Primary Examiner* — Jermie Cozart
(74) *Attorney, Agent, or Firm* — Robert L. Stearns; Dickinson Wright, PLLC

(57) ABSTRACT

The subject invention provides for disc brake pads and a method of designing disc brake pads. The brake pads include a backing plate and a friction pad having a center section, an outer edge, an inner edge and a friction surface. The method includes the step of developing a finite element model of a precursor brake pad design using dimensional and material property information of the backing plate and friction pad to perform a normal mode analysis of the precursor brake pad design. The method proceeds with the step of performing the normal mode analysis using the finite element model to determine whether there is an area on the friction surface having an excitation amplitude that is greater than a threshold value of amplitude. If an area having an excitation amplitude greater than the threshold value is determined, the precursor brake pad design is modified to provide a brake pad design having a relieved portion in the area.

10 Claims, 20 Drawing Sheets

U.S. PATENT DOCUMENTS

| | | | |
|---|---|---|---|
| 6,032,767 | A | 3/2000 | Roehling |
| 6,283,258 | B1 | 9/2001 | Chen et al. |
| 6,481,544 | B2 | 11/2002 | Brecht et al. |
| D506,423 | S | 6/2005 | Matsumoto |
| D507,773 | S | 7/2005 | Ono |
| 7,234,573 | B2 | 6/2007 | Kurz et al. |
| 2003/0168292 | A1* | 9/2003 | Kuo .......................... 188/24.11 |
| 2003/0178266 | A1 | 9/2003 | Hulten et al. |
| 2005/0023091 | A1 | 2/2005 | Ol et al. |
| 2007/0039789 | A1 | 2/2007 | Sano |

FOREIGN PATENT DOCUMENTS

| | | |
|---|---|---|
| FR | 2555271 | 5/1985 |
| GB | 2277968 A | 11/1994 |
| JP | 01224531 A | 9/1989 |
| JP | 05141455 A | 6/1993 |
| JP | 05164158 A | 6/1993 |
| JP | 06159406 A | 6/1994 |
| WO | 9113268 | 9/1991 |

* cited by examiner

METHOD OF MAKING DISC BRAKE PADS

CROSS-REFERENCES TO RELATED APPLICATIONS

This application claims the benefit of U.S. Provisional Patent Application Ser. No. 60/953,333 for an METHOD OF MAKING DISC BRAKE PADS, filed on Aug. 1, 2007, which is hereby incorporated by reference in its entirety. This patent application is related to Utility patent application Ser. No. 12/184,606, filed on Aug. 1, 2008 and Design patent application Ser. Nos. 29/282,904: 29/282,909; 29/282,911; 29/282,913; 29/282,914; 29/282,915; 29/282,917; 29/282,918, 29/282,920; 29/282,921; 29/282,922; 29/282,924 all of which were filed on Aug. 1, 2007.

BACKGROUND OF THE INVENTION

1. Technical Field

This invention relates generally to brakes and, more particularly, to a method of designing, prototyping and manufacturing disc brake pads.

2. Related Art

Disc brake squeal is a significant problem associated with disc brake systems, and has been a major contributor to noise related brake warranty claims. It is well known that disc brake squeal is primarily a phenomenon of instability due to friction induced vibration. Numerous studies and reviews have been conducted on friction induced vibration in general, and disc brake squeal phenomenon in specific, which have revealed that a squeal event involves two prominent mechanisms, negative damping and mode locking. Negative damping refers to the negative slope of damping versus velocity in the brake system, which essentially creates a self-excited oscillation system that provides energy to sustain squeal. Mode locking is the phenomenon that resonance modes of different brake components (pads, rotor, caliper, and anchor bracket) with close natural frequencies and similar mode shapes come together under the system coupling condition and behave as a single system resonant mode.

Some manufacturers use noise insulators, such as various shims and molded noise insulators on the side of the backing plate opposite the friction pad material to reduce unwanted brake noise. Modification of other brake system components, such as the rotors, calipers and anchor brackets have also been used to reduce unwanted noise.

For high frequency squeals the influence of the caliper and anchor bracket are diminished above approximately 5 kHz, and that noise insulators lose effectiveness above approximately 12 kHz. Modification of the rotor rarely provides significant reduction in high frequency squeals. Applicants believe that rotors have many resonant modes that fall into frequency ranges of interest. Modification of the rotor rarely provides significant reduction in high frequency squeal because rotors have many resonant modes that fall into the frequency range of interest. Redesigning rotors also involve higher cost and longer lead times.

Pad shape modification has been an effective means for reducing brake squeal, particularly high frequency squeal, and to reduce disc brake squeal some manufacturers have modified the shape of the friction pad material. Some of these modifications have included various chamfers on the ends of the friction pads, various transverse slots in the friction pads and combinations of end chamfers and transverse slots. Modifications to the shape of the friction material can be implemented quickly with relatively lower costs than modification of other brake components, and can be utilized both by original equipment manufacturers and automotive aftermarket suppliers. Also, since brake pads are wear parts, modifications to the pad shape can improve the performance of brake systems already in use.

The problem with pad shape modifications is that these modifications by themselves do not always achieve an acceptable amount of reduction of the brake squeal noise.

Additionally, finite element models with various degrees of sophistication have been developed for brake squeal analysis. It has been reported that a comprehensive model including pads, rotor, caliper, and knuckle assembly based on complex eigenvalue analysis has the ability of predicting low frequency squeal, which is related to more components in the brake system. However, building a comprehensive brake system model requires detailed information of all components involved, which might not be available during early stages of the design. Also, assumptions on different interface conditions, (i.e., support stiffness and damping) must be made in order to couple various components together in such models. Furthermore, friction behavior between the rotor and pads must be assumed in order to capture the negative damping mechanism. Validation of these models require at least the knowledge of the squeal frequencies and amplitudes, which again might not be available. An alternative model reported in a paper entitled "Reducing High Frequency Disc Brake Pad Squeal by Pad Shape Optimization" published as SAE Paper No. 2000-01-0444", including only the pads and rotor with caliper support stiffness based on frequency response analysis has been reported to substantially reduce the effort of building and executing a squeal analysis model while maintaining the capability of capturing the mode locking mechanism. However, this model still requires inputs from certain brake system components other than the brake pads, such as from the rotor and caliper, which makes it difficult to use in situations where large number of brake pad designs need to be evaluated, or where the information mentioned is simply not available.

While predictive models of the types described above have been reported, there exists a need for improved methods to analyze and predict this brake squeal, particularly high frequency brake squeal, for use in conjunction with the design, prototyping and manufacture disc brake pads.

SUMMARY OF THE INVENTION

The subject invention provides for a method of designing disc brake pads. The brake pad includes a backing plate and a friction pad having a center section, an outer edge, an inner edge and a friction surface. The method begins with the step of developing a finite element model of a precursor brake pad design using dimensional and material property information of the backing plate and friction pad to perform a normal mode analysis of the precursor brake pad design. The method proceeds with the step of performing the normal mode analysis using the finite element model to determine whether there is an area on the friction surface having an excitation amplitude that is greater than a threshold value of amplitude. If an area having an excitation amplitude greater than the threshold value is determined, the precursor brake pad design is modified to provide a brake pad design having a relieved portion in that area.

In another aspect, the area is located in the center section of the brake pad proximate the outer edge or the inner edge, and the step of modifying the precursor brake pad design provides a relieved portion in the center section along at least one of the outer edge or the inner edge of the brake pad. The relieved portion may include an outer relieved portion located along the center section of the outer edge. The relieved portion may also include an inner relieved portion located along the center section of the inner edge. The relieved portion may also include an outer relieved portion located along the center section of the outer edge and an inner relieved portion located along the center section of the inner edge. The relieved portion may include at least one of a V-shaped chamfer, a V-shaped notch or a U-shaped notch.

In another aspect, if an area having an amplitude which is above the threshold value is also located in an end section of the brake pad design proximate the outer edge or the inner edge, the step of modifying the precursor brake pad design also provides an end chamfer in the end section along at least one of the outer edge or the inner edge of the brake pad design. The end chamfer may be included on both of the first end and the second end and may be one of a parallel chamfer, a radial chamfer or a diamond chamfer, or a combination of them.

In another aspect, a method of making a brake pad, includes the steps of first providing a metal backing plate having a front face. Next, attaching a friction pad having an outer edge, an inner edge and a friction surface to the front face of the backing plate. The friction pad includes a relieved portion located along a center section of at least one of the outer edge or the inner edge. The relieved portion of the brake pad may include a notch, typically one of a V-shaped chamfer, V-shaped notch or a U-shaped notch. The friction pad also include an end chamfer.

In another aspect, the step of attaching includes molding the friction pad and the relieved portion onto the backing plate. The molding may include hot molding. The may also include press and cure molding. The step of molding the friction pad may also include molding an end chamfer on at least one of a first end or a second end of the friction pad. The end chamfers may include one of a parallel chamfer, a radial chamfer or a diamond chamfer, or a combination of them.

In another aspect, the step of attaching the friction pad and relieved portion may include steps of forming the friction pad and relieved portion and bonding the friction pad to the backing plate.

These and other features and advantages of this invention will become more apparent to those skilled in the art from the detailed description of a preferred embodiment. The drawings that accompany the detailed description are described below.

BRIEF DESCRIPTION OF THE DRAWINGS

The present invention will be readily appreciated in view of the following detailed description of an exemplary embodiment of the broader invention, accompanied by the following drawings.

DETAILED DESCRIPTION OF A PREFERRED EMBODIMENT

Figure 1:
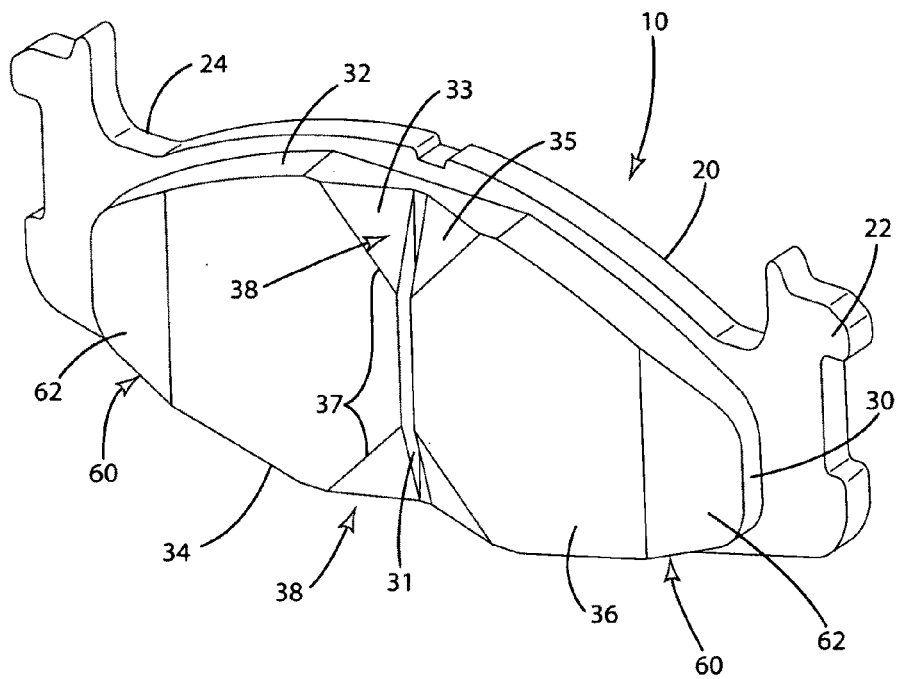
FIG. 1 is a perspective view of a disc brake pad of the invention.

As illustrated in the Figures and in particular FIGS. 1-6L, the present invention is directed toward a brake pad 10. The brake pad 10 generally includes a backing plate 20 and friction pad 30. The friction pad 30 is attached to a front face 22 of backing plate 20. The brake pad 10 may also include one or more optional noise damping elements 40 attached to backing plate 20, such as being attached to the front of backing plate 20 between the friction pad 30 and the front face 22 as an underlayer or underlayment (Not Shown), or attached as a damper 44 to a back face 24 of the backing plate 20. The friction pad 30 has a friction surface 36 and an outer circumference including an outer edge 32 and an inner edge 34. The friction pad 30 has a relieved portion 38 approximately located along a center section 50 of at least one of outer edge 32 or inner edge 34.

The backing plate 20 may have any suitable size and shape for adaptation to and mating engagement with one or more calipers of a disc brake system. As disc brakes are used on a plethora of vehicle applications of varying size, including motorcycles, automobiles, trucks, including light and heavy duty trucks, and other vehicles, the size and shape of the brake pads 10, backing plates 20 and friction pad vary widely but are generally proportionately with the size or weight of the vehicle in order to ensure sufficient braking force. The backing plate 20 may have any desired shape to allow for reliable and secure attachment to the calipers. Backing plate 20 may have a generally arcuate shape, with its length being greater than its width as illustrated in FIGS. 1-5, or other shapes as dictated by the mating components of the braking system, particularly the brake calipers. Backing plate 20 may also incorporate various features along its periphery, such as tabs, brackets, and various other attachment or indexing features to assist in attachment to or indexing with mating components of the braking system, such as calipers. The backing plate 20 may be made from any suitable material, including metals, ceramics and various laminate or composite materials, but frequently will be formed from a metal, such as various grades of steel. Backing plate 20 may be shaped or include features or components to assist or aid in the retention of the other elements of brake pad 10 or provide other functionality to brake pad 10, such as those incorporated to assist in the removal of heat from brake pad 10. In particular, backing plate may include one or more bores or openings of various shapes through its thickness to facilitate molding of either of both of friction pad 30 or damping elements 40. The backing plate 20 may also vary in thickness depending on the vehicle application. For example, steel backing plates in automotive applications frequently have a thickness of up to about 0.25 inches, but greater thicknesses are possible depending on the size and weight of the vehicle as well as other factors.

The friction pad 30 is formed from any suitable friction material, including non-asbestos organic (NAO), semi-metallic friction materials, ceramics or any other desired friction material. Most non-ceramic friction materials exist in a wide variety of formulations, which include a wide variety of friction modifying constituents and may be described generally as comprising a matrix of a resin binding agent, a fibrous support structure, a friction modifying system and a wear system of fillers. While the present invention may be made from a variety of materials, and applied to a variety of different brake pads, the constituents of most non-asbestos organic and semi metallic materials are described in greater detail below as they are the most common materials used in brake pads. Of course it should be readily understood that the following material descriptions are only for ease of understanding brake pads generally and are optional constituents of the brake pad that depend on the desired formulations and braking characteristics. Common friction materials are formed of these constituents, wherein the resin binding agent forms a polymer matrix to bind together the fibrous support structure, friction modifying system and wear system. The constituents generally may be categorized as a chemical mixture and a composite material, but also will be understood to include compositions where one or more of the constituents have partial or complete solubility in one or more of the other constituents.

The resin binding agent may include any suitable resin which polymerizes to form a matrix capable of binding together the other constituents of friction material. It is typically preferred that the resin binding agent comprise a thermoset polymer resin in an amount of about 5 to about 30 percent by weight of friction material. Thermoset polymer resins characteristically have a highly cross-linked polymer structure. It is believed that other polymers with highly cross-linked structures may also be suitable for use as a resin binding agent, including various co-polymers of thermoset and thermoplastic materials, as well as thermoplastic materials that exhibit a high degree of cross-linking and have mechanical and physical properties similar to those noted herein for thermoset materials. It is typically preferred that the resin binding agent comprise a phenolic resin, such as a phenol-formaldehyde resin. However, it is believed that many other resins are well-suited for use as a resin binding agent, such as various epoxy-modified phenolic, silicone-modified phenolic, condensed poly-nuclear aromatic, cyanate ester, melamine, melamine-formaldehyde, urea-formaldehyde, resorcinol-formaldehyde, polyurethane, polyalkyd, silicone, polyester, acrylic, furan and polyimide resins.

The fibrous support structure may include any suitable fibrous support structure. The fibrous support structure may include continuous, discontinuous, chopped and other fibrous support structure, or a combination of the above, and may include various woven and non-woven fiber elements, such as various fabrics, felts, mats honeycomb-like fabric and fiber structures and the like. Important characteristics of the fibrous support structure are fiber orientation, aspect ratio, fiber-binder adhesion, fiber strength and fiber morphology. Any suitable fiber material or combination of fiber materials may be used, including, without limitation, those of various grades of steel (e.g., high carbon, low carbon and stainless steels) and other metals, glasses, ceramics, minerals, cotton, carbon or other fibers, both natural and man-made or synthetic fibers. Besides various steel fibers, metal fibers may include iron and iron alloys, copper and copper alloys and any other metals capable of providing a support structure. Glass fibers may include all manner of silicate and non-silicate glass fibers, including both boron-containing and boron-free E-glass, as well as all manner of other commercial grades of glass fibers. Ceramic fibers may include various metal oxides, carbides, nitrides, silicates and titanates, such as aluminum oxide, silicon carbide, silicon nitride and potassium titanate. Carbon fibers may include those made of carbon and various carbon compounds, including various carbon polymers, such as various aramid, ultra high density polyethylene, polybenzoxazole, polyacrilonitrile (PAN), cellulose and other carbon-containing polymeric fibers. Mineral fibers may include basalt, sepiolite, mineral wool, asbestos and other mineral fibers. The fibers of the fibrous support structure generally have a diameter of about 1 mm or less, depending on the fibrous material used, but larger diameter fibers may be used. Discontinuous fibers generally have a length of about 0.5 inches or less, again depending on the fibrous material used, and are generally no less than three times longer than they are wide. Glass fibers generally have a diameter of about 10-100 microns and a length of 0.125-0.5 inches. Aramid fibers generally have a diameter of about 10-30 microns and a length of about 1 mm or less, but may be considerably longer depending on the application. Mineral fibers generally have a diameter of 3-50 microns, and are generally no less than three times longer than they are wide. Generally, the fibrous support structure comprises 10-50 percent by weight of friction material 50, depending on the fiber type used and other factors.

The friction modifying system may comprise a single friction modifying constituent or a plurality of friction modifying constituents. The friction modifying system adjusts the friction level of the friction material as needed, or more particularly the friction coefficient of friction material. The friction modifying system may include any friction modifying constituent or combination of constituents. Generally, these constituents fall into two categories, lubricant and abrasive materials.

Commonly used lubricant materials as friction modifying constituents include various forms of graphite, such as graphite powder and flakes, and various metal sulfides, such as those of tin, copper, lead, molybdenum and antimony, as well as cashew shell friction particles and rubber crumb or particles, either individually or in combination.

Commonly used abrasive materials as friction modifying constituents include metal powders, such as copper, copper-zinc, copper-tin, iron, and aluminum powders. They also include metal oxide, carbide and silicate particles, such as aluminum oxide, magnesium oxide, iron oxide, zirconium oxide, chromium oxide, silicon oxide, zirconium silicate and alumino silicate particles, individually or in combination. The friction modifying system may include many other mineral, organic and ceramic materials including both natural or man-made materials which may act as friction modifying constituents.

The friction modifying system preferably comprises 0.5 to 40 percent by weight of friction material. Friction modifying constituents generally have a maximum particle size (or diameter for spherical particles) ranging from about 5 microns to 8 mesh (about 2.36 mm), but it is believed that particles having larger and smaller sizes may be used. As examples, aluminum oxide particles typically have a size of about 5 microns, cashew friction particles have a size of about 20 mesh (about 0.85 mm), carbon particles have a size of about 8-325 mesh (0.045-2.36 mm) and silica particles have a size of about 200-325 mesh (0.045 0.075 mm).

In friction material as a friction constituent, the wear system as a filler may have many functions, including filling the resin matrix to provide improved high temperature and wear properties of friction materials, as well as to provide colorants and other materials which control various other physical or chemical properties or both of friction material. The wear system comprises filler materials used to further modify and control, together with other friction constituents, various other chemical and physical properties and characteristics of friction material. These may include heat resistance, wear control, density, color and various other physical and chemical properties. Wear system fillers will depend on, among other factors, the resin binding agent, fibrous support structure and friction modifying system selected. These fillers may include organic as well as inorganic filler constituents, including various metal silicates. Examples include, in its man-made or mineralogical forms, barium sulfate (e.g., barytes), calcium carbonate (e.g., calcite, chalk), magnesium silicate (e.g., talc), magnesium carbonate (e.g., dolomite or magnesite), mica, alkali metal titanates, vermiculite, molybdenum trioxide, cashew dust, rubber dust, kaolin and various clays. It will be noted that cashew particles and rubber particles may also be used as part of friction modifying system. These materials are used individually or in combination with other similar materials at typically 10 to 40 percent by weight of friction material. Wear system constituents generally have a maximum particle size (or diameter for generally spherical particles) less than or equal to about 100 mesh (about 0.149 mm), but it is believed that particles having larger sizes may also be used.

As described above, the friction pad 30 includes the outer edge 32, the inner edge 34 and the friction surface 36. The outer edge 32 and the inner edge 34 may have any suitable shape or profile. The exemplary pad 10 illustrated in FIGS. 1 and 2, outer edge 32 and inner edge 34 are shown as having arcuate shapes, but other shapes may also be used. For example, the outer edge 32 and inner edge 34 may generally have a profile with one or more flat portions of varying lengths.

The friction surface 36 is the surface that is operative to contact the brake rotor (not shown) in a brake system and is traditionally planar to maximize the engagement surface. Although not necessary, brake pads 10 frequently are designed such that they have bi-lateral symmetry or nearly bi-lateral symmetry about a central axis 52. This symmetry allows for easy installation by removing the requirement that the brake be keyed to a particular position and allows for more cost-effective manufacture and distribution. For brake pads not having such symmetry, the central axis 52 may be defined as a line which in a front view of the pad 10 divides brake pad 10 into left and right portions of approximately equal areas.

Figure 2:
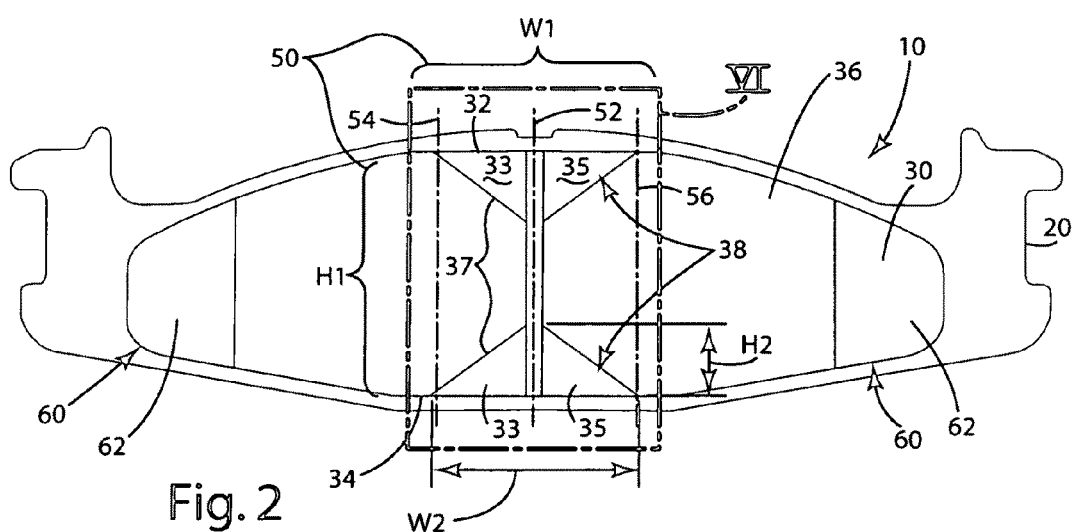
FIG. 2 is a front view of the disc brake pad of FIG. 1.
Figure 3:
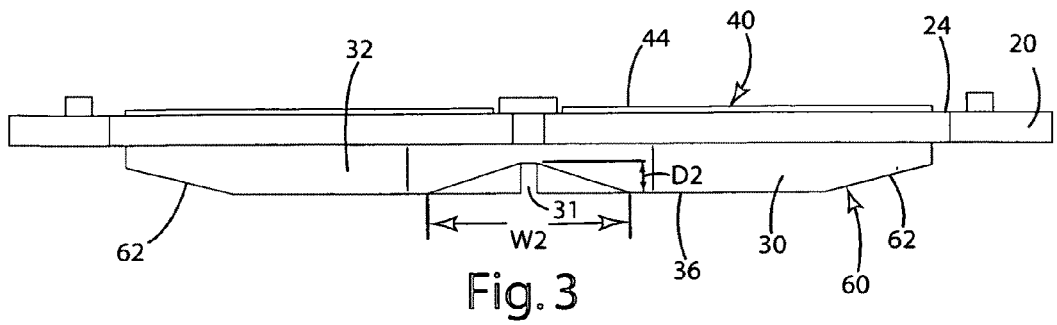
FIG. 3 is a top view of the disc brake pad of FIG. 1.
Figure 4:
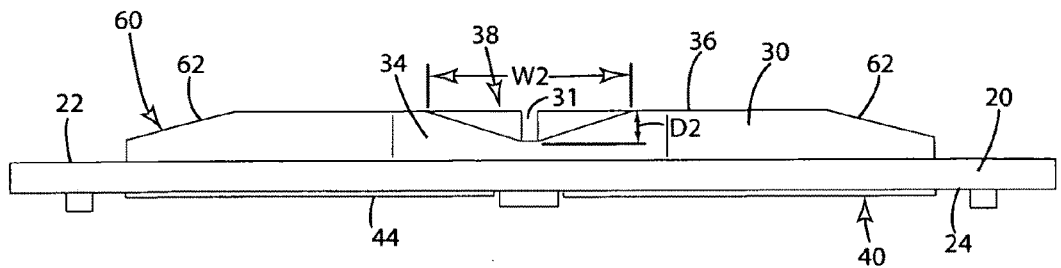
FIG. 4 is a bottom view of the disc brake pad of FIG. 1.
Figure 5:
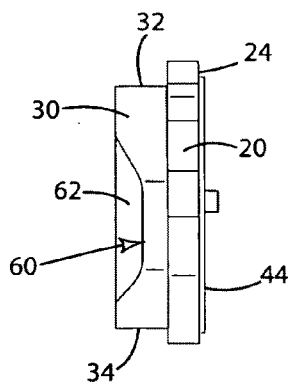
FIG. 5 is a right side view of the disc brake pad of FIG. 1.
Figure 6A:
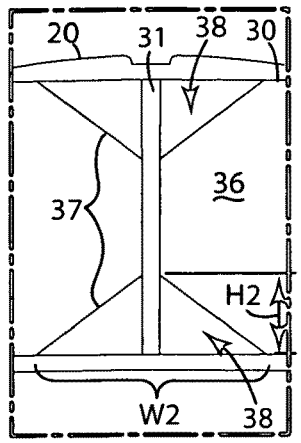
FIGS. 6A-6L are exemplary brake pads of a relieved portion with reference to region 6 of FIG. 2.
Figure 6B:
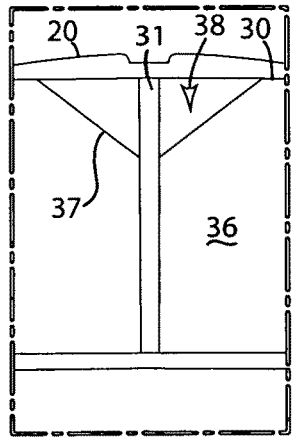
Figure 6C:
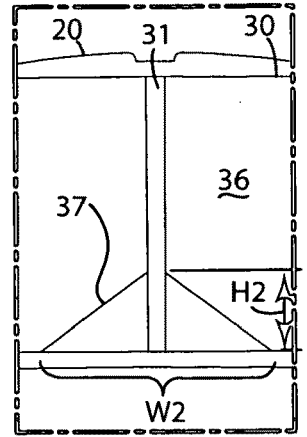
Figure 6D:
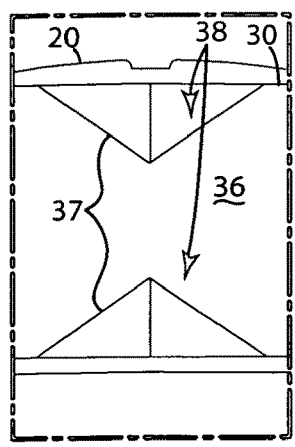
Figure 6E:
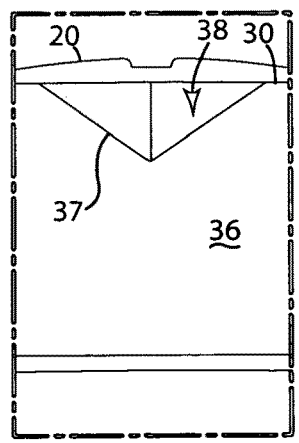
Figure 6F:
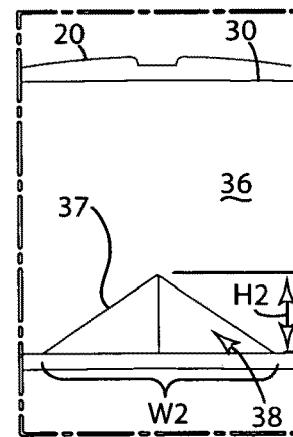
Figure 6G:
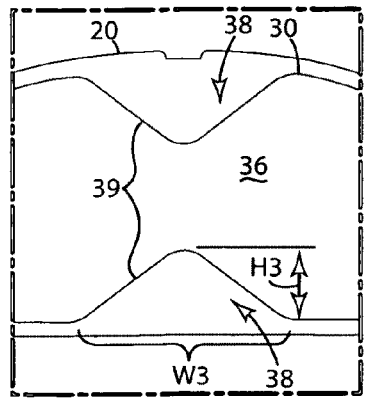
Figure 6H:
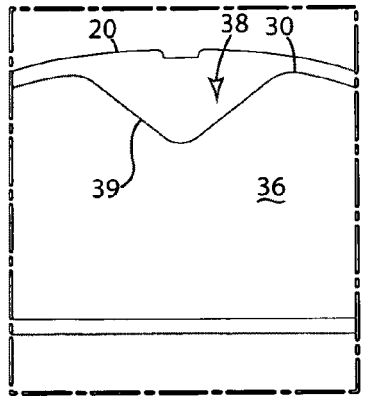
Figure 6I:
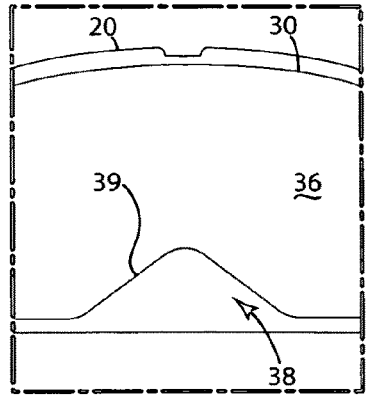
Figure 6J:
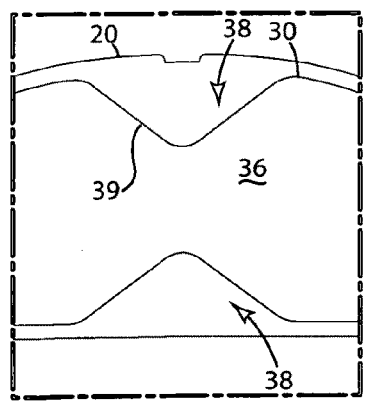
Figure 6K:
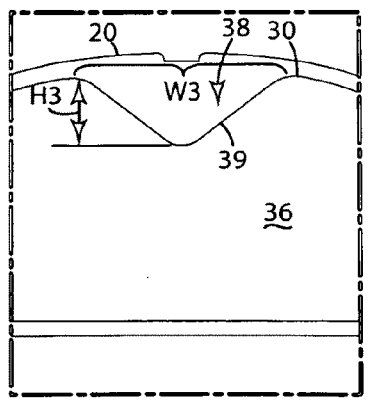
Figure 6L:
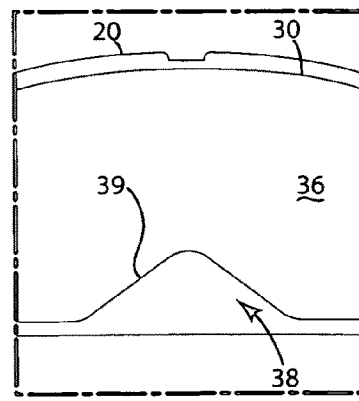

The center section 50 refers generally to a region or area across the height and width of friction pad 30 which is illustrated in FIG. 2 as being bounded on one side by vertical line 54 and on another side by vertical line 56 that may vary in width ($w_1$) and height ($h_1$), and thus in size, but which is generally symmetric about the central axis 52. As described below, Applicants have determined that the amount of brake squeal noise generated by various brake pad 10 designs when used in various brake systems can be significantly reduced, as described below, by incorporation of at least one relieved portion 38 located along a center section 50 on at least one of the outer edge 32 or the inner edge 34, and may be located along both the outer and inner edges 32 and 34. The friction pad 30 may have any suitable thickness, and thickness will generally vary considerably proportionate to the size of the vehicle and brake system in which brake pad 10 is employed. For automotive applications the nominal pad thickness of the brake pad 10 typically ranges from about 0.3-0.6 inches.

Figure 22:
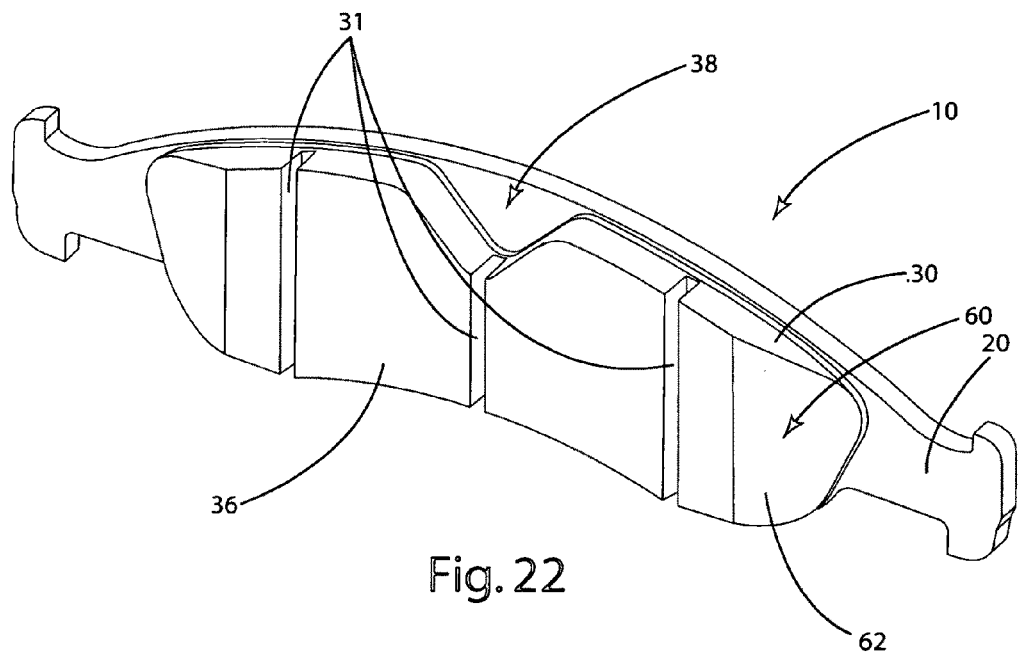
FIG. 22 is a perspective view of a brake pad of the invention having a V-shaped notch relieved portion and a plurality of transverse slots.

The friction pad 30 may also include one or more transverse slots 31. These slots 31 generally extend across the entire height of friction pad 30 and may have any suitable width and depth. In several exemplary automotive embodiments of brake pad 10, the width of slot 31 ranged from about 0.1 to 0.15 inches with a depth ranging from about 0.15 to 0.4 inches. The slot 31 will generally not extend through the entire thickness of friction pad 30 and will generally be designed so as to provide a remaining pad thickness at the bottom of the slot of a minimum of about 0.08 inches. Many times these slots 31 are used as markers to tell when the pads should be replaced. A brake pad 10 with multiple slots 31 and a V-notch relieved portion 39 is shown in FIG. 22. As illustrated in FIG. 22, the transverse slot 31 may intersect the relieved portion 38 located at the center section 50 of at least one of the outer and inner edges 32 and 34 and the relieved portion 38 may be approximately centered about the slot. Of course in some instances it may be desirable to offset the center of the relieved portion 38 from the slot 31.

Figure 23:
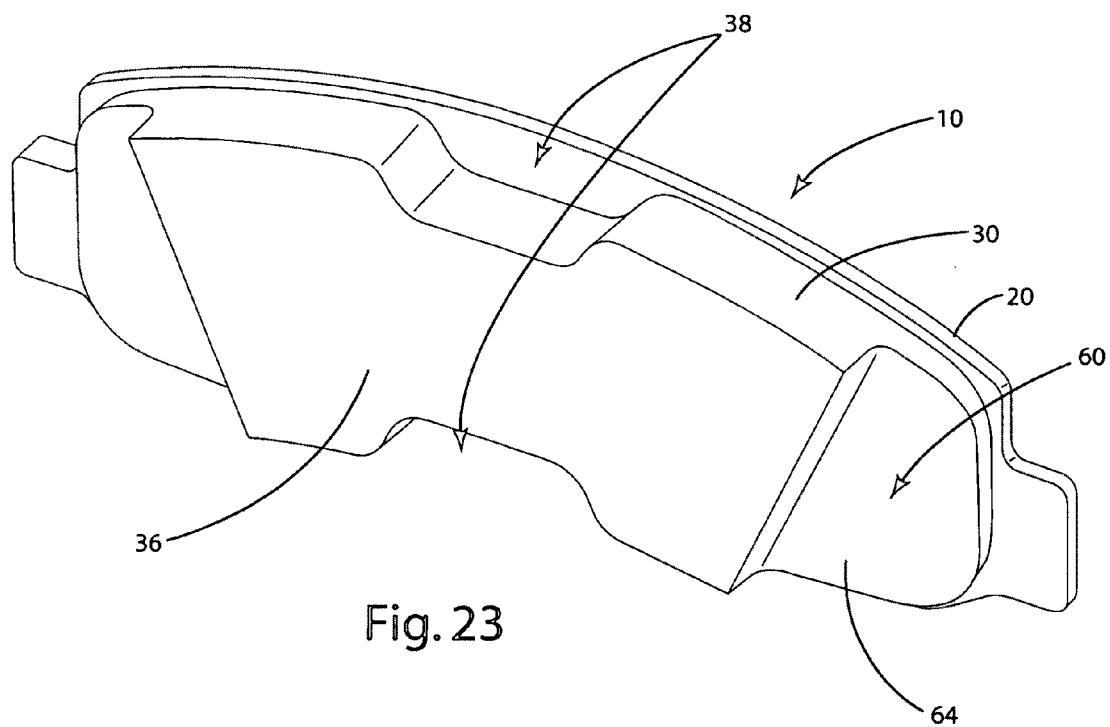
FIG. 23 is a perspective view of a brake pad of the invention having a U-shaped notch relieved portion and radial end chamfers.

The relieved portion 38 may have any suitable size and shape sufficient to provide a reduction of the amount of brake squeal noise reduction, and preferably will be sized and shaped using the method described herein to provide an optimum reduction of the brake squeal noise in the brake system in which brake pad 10 is to be used while also tending to maximize the size of friction surface 36, or at a minimum maintaining the size of friction surface 36 so that it is sufficient to develop a braking force sufficient to meet the requirements of the braking system. While any suitable shape may be used, it is believed that relieved portions 38 generally having a u-shape or v-shape section profiles as viewed perpendicular to friction surface 36 are preferred. V-shaped relieved portions 38 may include V-chamfer portions 37 and V-notch portions 39 as shown in FIGS. 6A-L and although not illustrated, the relieved portion 38 may have the shape of a portion of the side of a cone. A brake pad 10 having a U-shaped relieved portion 38 is shown in FIG. 23.

The V-chamfer relieved portion 37 is formed by a pair of chamfer surfaces or planes 33 and 35 which generally decline from friction surface 36 toward both central axis 52 and the edge of friction pad 30 (upper 32 or lower 34) on which relieved portion 38 is partially located. The chamfer surfaces 33 and 35 may be flat surfaces or curved surfaces. While the exemplary embodiment shows the chamfer surfaces 33 and 35 as being substantially mirror images of one another about the central axis 52, the chamfer surfaces 33 and 35 may have different shapes, profiles and surfaces. V-shaped chamfers have a width ($w_2$), height ($h_2$) and depth ($d_2$) which depend on the amount of relief necessary to obtain the desired reduction in the brake squeal noise for the particular brake system and vehicle application, as illustrated in FIGS. 6A-F. In a number of exemplary automotive vehicle embodiments, $w_2$ ranged from about 1.1 to 1.6 inches, $h_2$ ranged from about 0.4 to 0.6 inches, and $d_2$ ranged from about 0.2 to 0.4 inches.

V-notch relieved portion 39 is formed by removing an entire V-shaped portion 29 of friction pad 30 along the edge of friction pad 30 (upper 32 or lower 34) on which relieved portion 38 is located. V-shaped notches have a width ($w_3$) and height ($h_3$) which depend on the amount of relief necessary to obtain the desired reduction in the brake squeal noise for the particular brake system and vehicle application, as illustrated generally in FIGS. 6G-6L. In a number of exemplary automotive vehicle embodiments, width $w_3$ ranged from about 1.1 to 1.6 inches and height $h_3$ ranged from about 0.4 to 0.6 inches.

The shape and size of relieved portion 38, whether V-chamfer 37 or V-notch 39 or another shape may be determined by any suitable method, including the analytical method described below or empirically. Relieved portion 38 may be formed by any suitable method, including molding friction pad 30 so as to include relieved portion 38, or by using mechanical means to provide the relief by removal of material, such as by sawing, grinding or the like. Molding the relieved portions 38 may be achieved using well-known molding methods such as, press curing (curing in the mold), press and cure (molding in a press followed by hot curing outside the press), or any other molding method known in the art.

Relieved portion 38 is also intended to include any suitable form of relieving the friction surface 36, including forms other than V-chamfers and U-shape or V-shape notches, where some of the friction material remains in relieved portion 38 (similar to V-chamfers), such as by the incorporation of one or more curved surfaces that are used to provide relieved portion 38 (i.e., a variant of V-chamfers where surfaces 33 and 35 are curved with a generally convex, concave or other form of curvature) (not shown). Similarly, it is believed that relieved portion 38 could have a rectilinear shape, such as a box or trapezoidal shape.

Figure 21A:
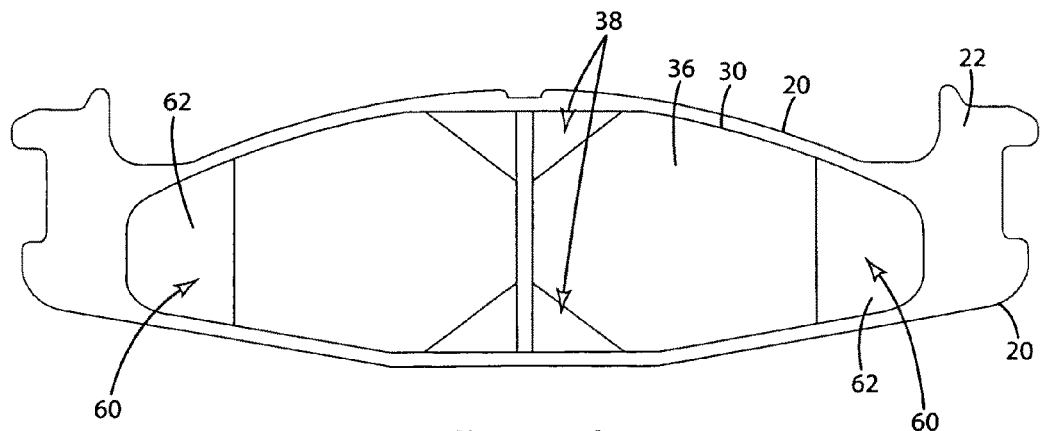
FIGS. 21A-C are front views of a brake pad illustrating various end chamfer configurations.
Figure 21B:
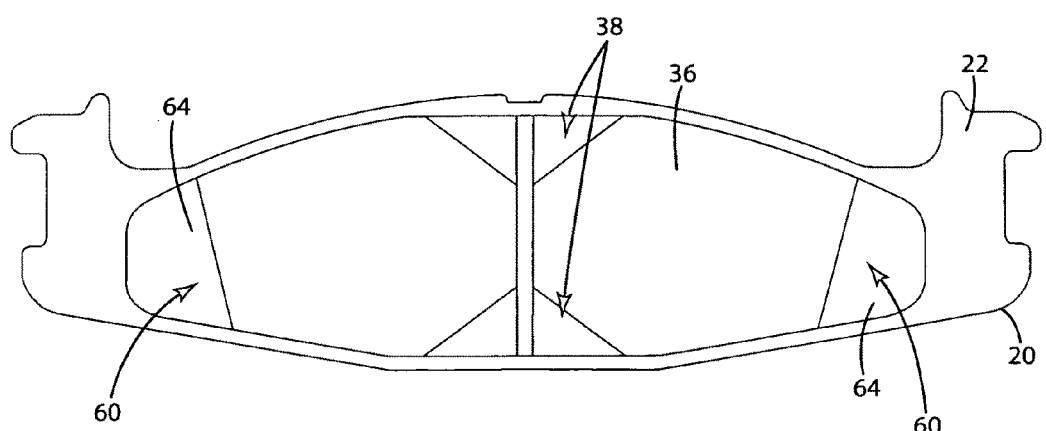
Figure 21C:
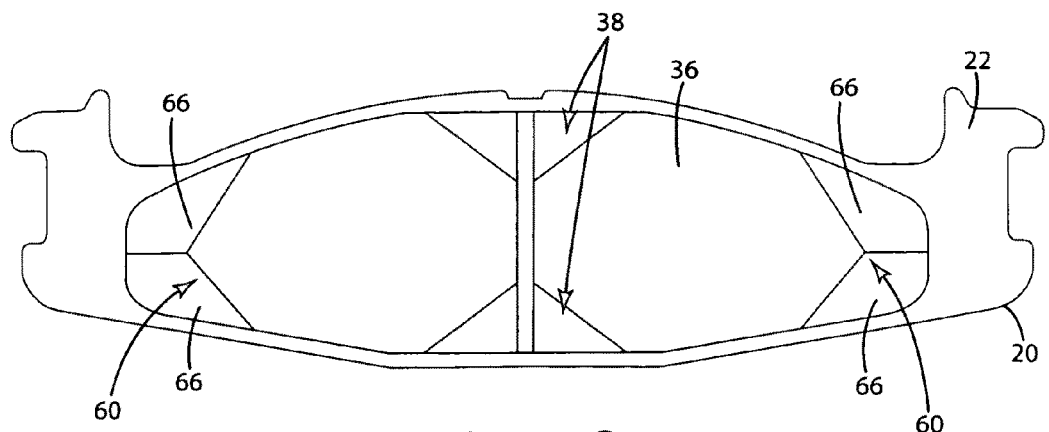

The brake pad 10 may also include end chamfers 60 on either end or both ends of friction pad 30 which also assist in reducing brake squeal noise. Referring generally to FIGS. 21A-C, these chamfers may include parallel chamfers 62, radial chamfers 64 or diamond chamfers 66. The optimum size and location of the end chamfers 60 may be determined analytically using the method described herein or empirically.

The brake pad 10 may also include noise damping elements 40 attached to the backing plate 20. Noise damping elements 40 may be attached to the front of the backing plate 20 between the friction pad 30 and the front face 22 as an underlayer or underlayment, or attached as a damper 44 to the back face 24 of backing plate 20. The damping elements 40 may include elements that are attached to the back face 24 of the backing plate 200, such as various forms of shims. The damping elements 40 may also be molded directly to either of the front face 22 or the back face 24, or both, of the backing plate 20, either before or in conjunction with the molding of friction pad 30. Noise damping element 40 may also be formed on the back face 24 in conjunction with the molding of friction pad 30 by molding friction material or a special damping material through openings (not shown) in backing plate 20 onto the back face 24 as described in commonly assigned U.S. Pat. No. 5,413,194 which is hereby incorporated herein by reference in its entirety.

The subject invention further provides for a method of designing disc brake pads 10. As described above, the brake pad 10 includes the backing plate 20 and the friction pad 30. The method begins with the step of developing a finite element model of a precursor brake pad design using dimensional and material property information of the backing plate 20 and friction pad 30 to perform a normal mode analysis of the precursor brake pad design. The method proceeds with the step of performing the normal mode analysis using the finite element model to determine whether there is an area 70 on the friction surface 36 having an excitation amplitude that is greater than a threshold value of amplitude. If an area 70, as shown in FIGS. 8A-8C, 9A-9C, 14A-14D, 18A-18D, having an excitation amplitude greater than the threshold value is determined, the precursor brake pad design is modified to provide a brake pad design having a relieved portion 38 in the area 70. If the area 70 is located in the center section 50 of the brake pad proximate the outer edge 32 or the inner edge 34, the precursor brake pad design is modified at the area 70 proximate the outer 32 or inner edge 34 to provide a relieved portion 38 in the center section 50 along at least one of the outer edge 32 or the inner edge 34 of the brake pad. The relieved portion 38 includes at least one of a V-shaped chamfer, a V-shaped notch, a U-shaped notch or any other style or shape of chamfer or notch.

If the area 70 having an excitation amplitude greater than the threshold value is determined to be located in an end section of the brake pad proximate the outer edge 32 or the inner edge 34, the precursor brake pad design is modified to provide an end chamfer 60 in the end section along at least one of the outer edge 32 or the inner edge 34 of the brake pad 10. The end chamfer may be a parallel chamfer 62, a radial chamfer 64, a diamond chamfer 66, or any other style or shape chamfer.

The subject invention further provides for a method of making a brake pad 10. The method begins with the step of providing a metal backing plate 20 having a front face 22. A friction pad 30 having an outer edge 32, an inner edge 34 and a friction surface 36 is then attached to the front face 22 of the backing plate 20. The friction pad 30 has a relieved portion 38 located approximately along a center section 50 of at least one of the outer edge 32 or the inner edge 34. The friction pad 30 may be attached to the backing plate 20 by molding the friction pad 30 having the relieved portion 38 onto the backing plate 20. The molding may be done by any method known in the art, including but not limited to hot molding and press and cure molding. The friction pad 30 may be also attached to the backing plate 20 by bonding the friction pad 30 to the backing plate 20 after forming the friction pad 30 and relieved portion 38. The relieved portion includes at least one of a V-shaped chamfer, a V-shaped notch, a U-shaped notch or any other chamfer or notch known in the art. The precursor brake pad design may also be modified to provide an end chamfer 60 in the end section along at least one of the outer edge 32 or the inner edge 34 of the brake pad. The end chamfer 60 may be a parallel chamfer 62, a radial chamfer 64, a diamond chamfer 66, or any other chamfer known in the art.

In general terms, this invention provides a simplified finite element model for analyzing the high frequency squeal behavior of the brake pad 10 based on normal-mode analysis of the brake pad only, and is presented as a rapid design tool for designing, prototyping and manufacturing alternative friction pad shapes having improved high frequency squeal characteristics. The effect and design methodology of pad shape on high frequency squeal are discussed. Fifteen real world brake applications have been analyzed and alternative pad shapes generated using the methodology presented herein. Dynamometer validation tests indicate excellent correlation between brake squeal behavior predicted for these designs by the finite element model and the actual performance of the brake pads in a braking system.

A rapid engineering design tool and methodology is presented for reducing high frequency brake squeal. The finite element model is simple and easy to build with only friction material lining information required. Alternative pad shapes were designed using the tool presented herein for 15 brake applications. Validation testing on a dynamometer demonstrated excellent correlation between model prediction and reality.

The tool and methodology presented here in is especially useful in the following situations 1) where pad shape designs are required for large number of applications. 2) in the early stage of program to design a new brake pad set when many components of the brake system are not yet available; 3) where a common pad shape is designed for multiple applications; and 4) to provide initial pad shape design for subsequent pad shape optimization to be done using more elaborate models.

EXAMPLES

During a brake squeal event, the friction forces, both normal and tangential, arise from the contact of rotor and pads. The friction forces involve both macro and micro scales on the interface and have broad band spectra, which can excite all resonant modes of the contact pair (i.e., disc brake pads and rotor). The total excitation from the pads is therefore the superposition of all resonant modes of the pads.

The above observation provides an intuitive guide for designing relieved portions 38, such as chamfers to reduce high frequency squeal. The following examples are given which refer to the use of V-shaped chamfers as described above; however, the same analytical methods may be used to provide U-shaped notches or V-shaped notches, where all of the brake pad material in the notch is removed, as relieved portions. Chamfers should be designed to target certain resonant modes such that the high amplitude areas 70 of the corresponding mode shapes on the contacting surface are removed. Since chamfers generally do not shift pad natural frequencies significantly, their primary function is to reduce the excitation level from the pads.

By focusing on the excitation from pads, finite element models are created for pads only. The friction material is transversely isotropic with five independent elastic constants, which can be measured through ultrasound equipment.

The methodology of pad shape design proposed here includes the following steps: 1) Conduct normal mode analysis for the pads at the free-free condition; 2) Examine the pad mode shapes to identify the primary out of plane modes (bending and torsional). Low frequency modes (<5 kHz) are not considered since they tend to interact with other brake components (caliper, anchor and/or knuckle). In-plane modes and modes with very complicated mode shapes are also not considered as no clear indication of pad shape design can be derived. Manufacturing feasibility, lining life and performance concerns can also limit the pad shape options; and 3) Design pad shape (chamfer, slot, notch, etc.) to target the modes identified above by removing high amplitude areas 70 on the friction surface.

The design tool and methodology presented above have been applied on fifteen brake applications with alternative pad shapes generated. In order to assess the effectiveness of the new pad shape on high frequency squeal, both the original and the new pad shape designs were tested on the dynamometer using the SAE J2521 procedure. Representative examples are given in the following sections to illustrate the process.

Example 1

Figure 7A:
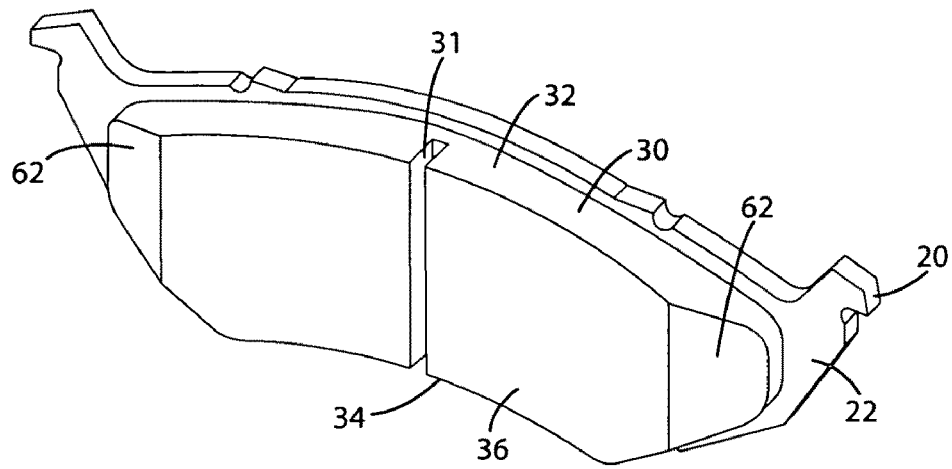
FIGS. 7A-7B are perspective views of a prior art inner and outer disc brake pad, respectively, prior to alteration of the design in accordance with the invention.
Figure 7B:
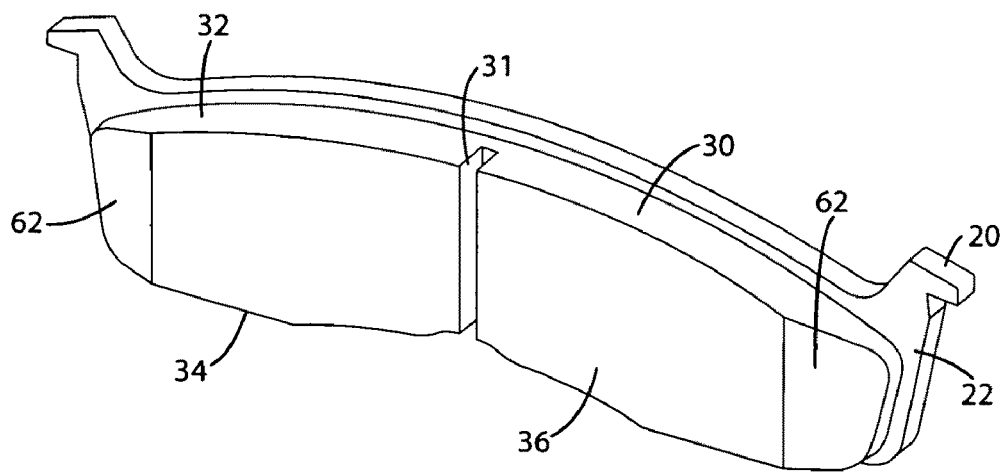
Figure 8A:
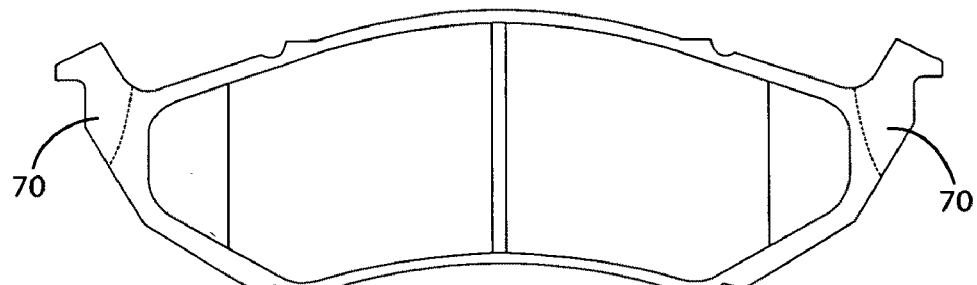
FIGS. 8A-8C are computer generated graphic images of some of the primary out of plane mode shapes from the normal mode analysis, including, targeted mode shapes for the inner pad of FIG. 7A at 7.9 kHz (FIG. 8A) 9.2 kHz (FIG. 8B) and 13.1 kHz (FIG. 8C)
Figure 8B:
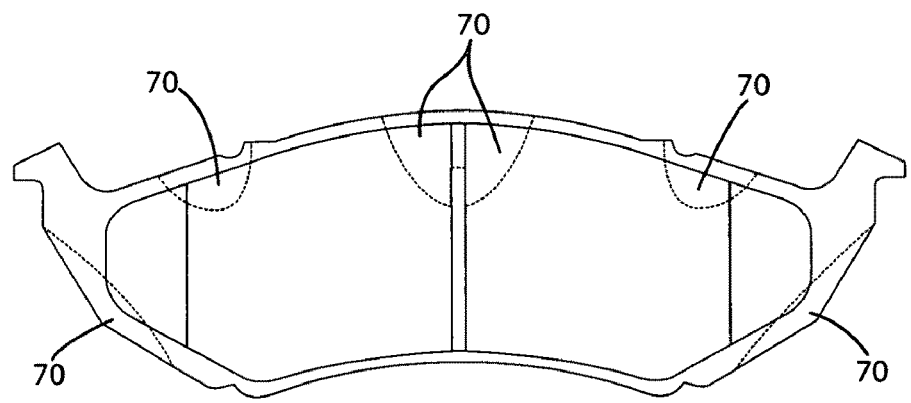
Figure 8C:
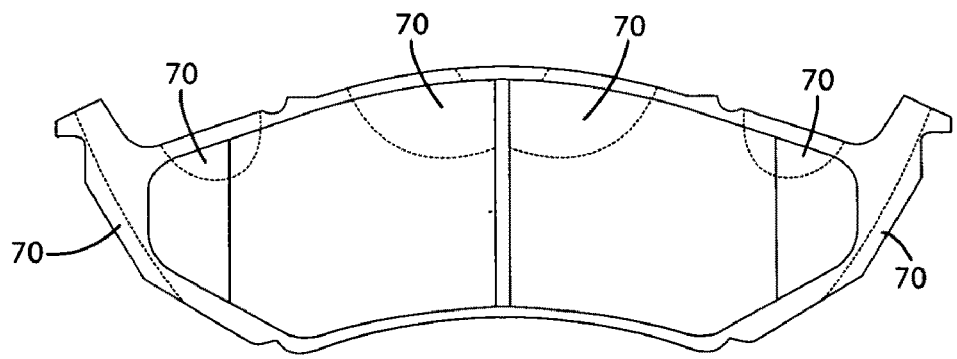
Figure 9A:
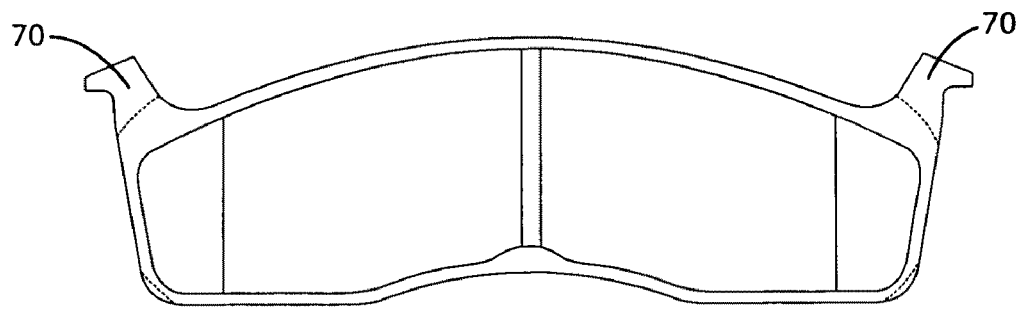
FIGS. 9A-9C are computer generated graphic images of some of the primary out of plane mode shapes from the normal mode analysis, including, targeted mode shapes for the outer pad of FIG. 7B at 6.7 kHz (FIG. 9A); 7.9 kHz (FIG. 9B) and 11.8 kHz (FIG. 9C)
Figure 9B:
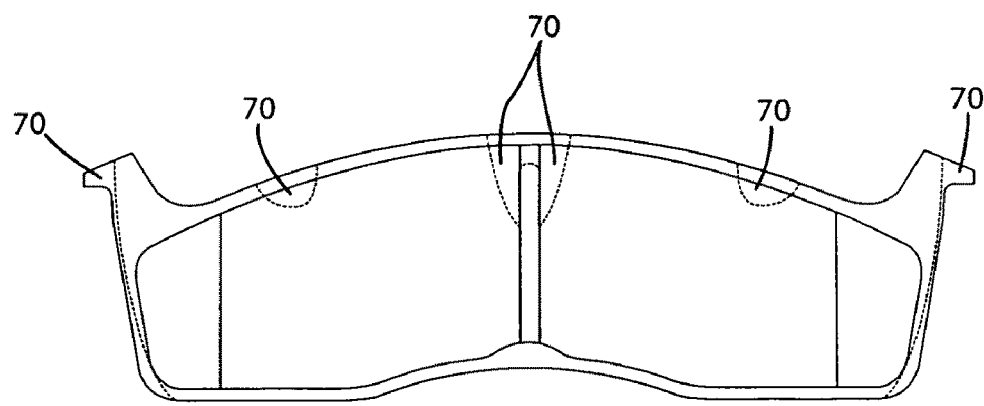
Figure 9C:
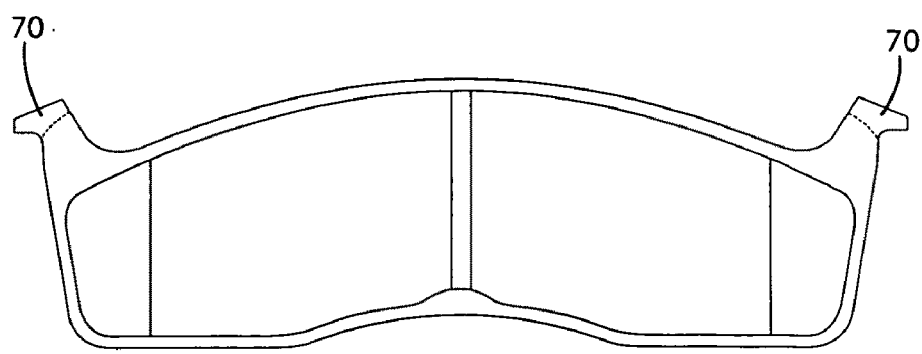
Figure 10A:
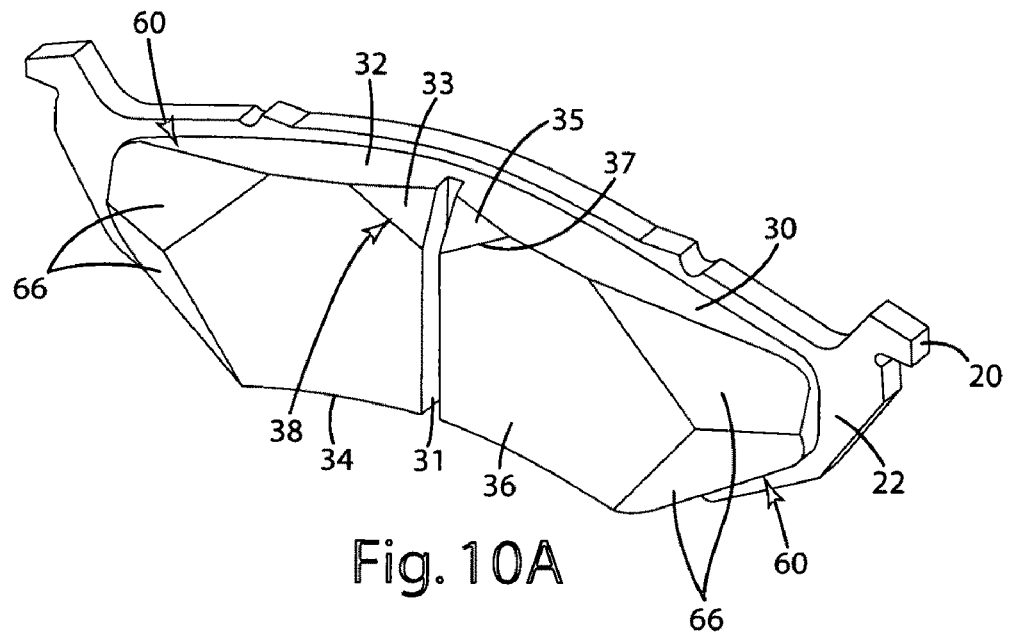
FIGS. 10A-10B are perspective views of the disc brake pads of FIGS. 7A-7B, respectively, modified with relieved portions in accordance with the invention.
Figure 10B:
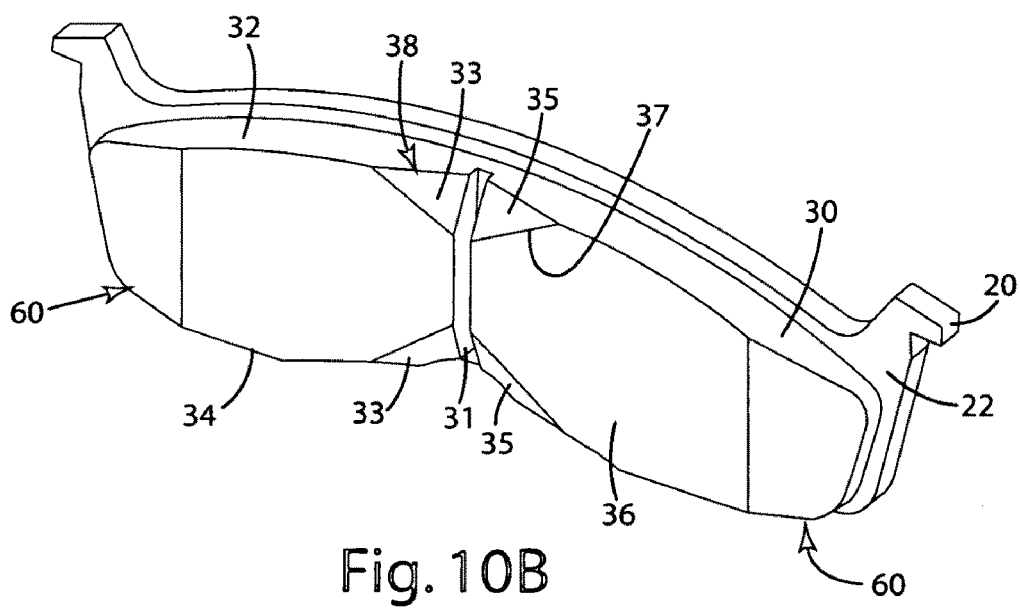
Figure 11:
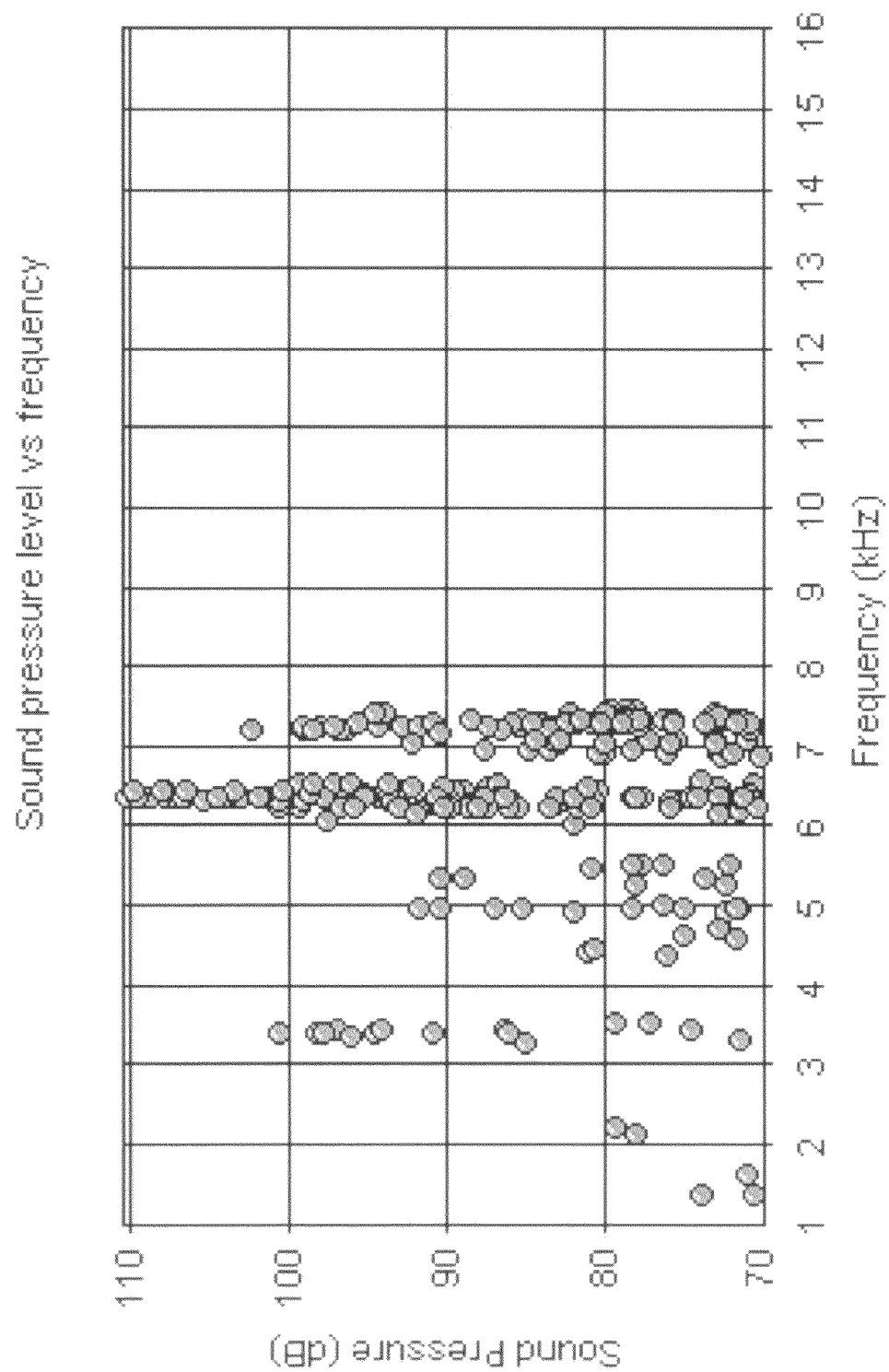
FIG. 11 is a graph of squeal event measurements from dynamometer tests on the disc brake pad having the design illustrated in FIGS. 7A-7B.
Figure 12:
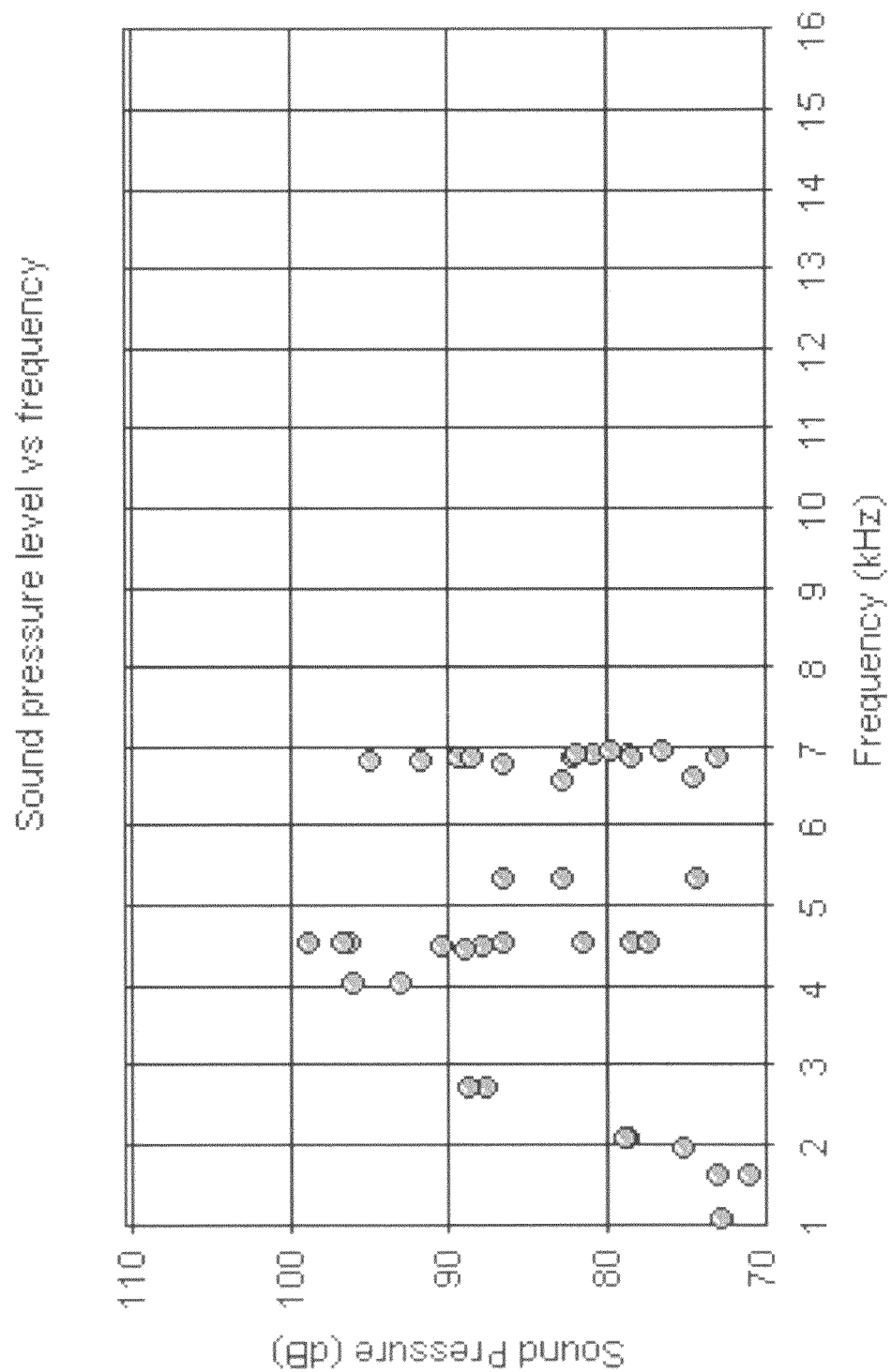
FIG. 12 is a graph of squeal event measurements from dynamometer tests on the disc brake pad having the design illustrated in FIGS. 10A-10B.

FIGS. 7A-B show the original pad shape for brake #1, a minivan application, which includes 15 mm parallel end chamfers 62 and a center slot 31 on both inner and outer pads. FIGS. 8A-C and 9A-C show some of the primary out of plane mode shapes from the normal mode analysis. It can be seen that high amplitudes exist near the outer edges/corners and top center of the lining surface for the inner pad. For the outer pad, high amplitudes exist near the outer edges as well as top and bottom center of the lining surface. The original 15 mm parallel chamfer 62 is apparently not adequate to reduce the excitation from these modes. Following the methodology outlined in the previous section, the high amplitude areas 70 in the lining surfaces are removed as much as possible. FIG. 10A shows the modified inner pad of FIG. 7A and includes a diamond chamfer 66, center slot 31, and top center V-chamfer 37. FIG. 10B shows the modified inner pad of FIG. 7B and includes a 20 mm parallel chamfer 62, center slot 31*m* and top and bottom center V-chamfers 37. Dynamometer tests (SAE J2521) were conducted for pads with the original shape and new shape. FIGS. 11 and 12 display the squeal events from these two tests, FIG. 11 showing squeal events for the original pad shape and FIG. 12 for the modified pad shape. The new pad shape eliminated squeal at 6.4 kHz and significantly improved squeal around 7 kHz.

Example 2

Figure 13A:
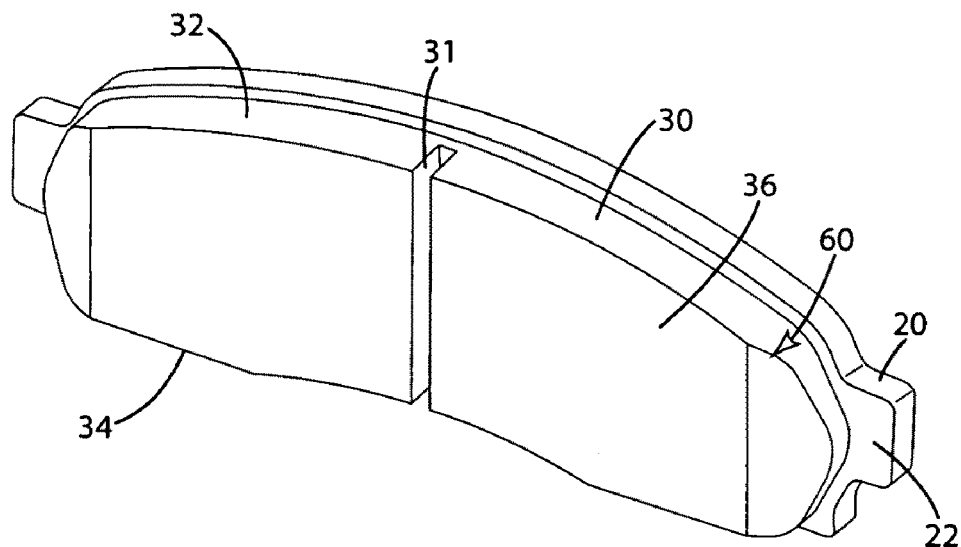
FIG. 13A is a perspective view of a second prior art disc brake pad having common inner and outer pads prior to alteration of the design in accordance with the invention.
Figure 13B:
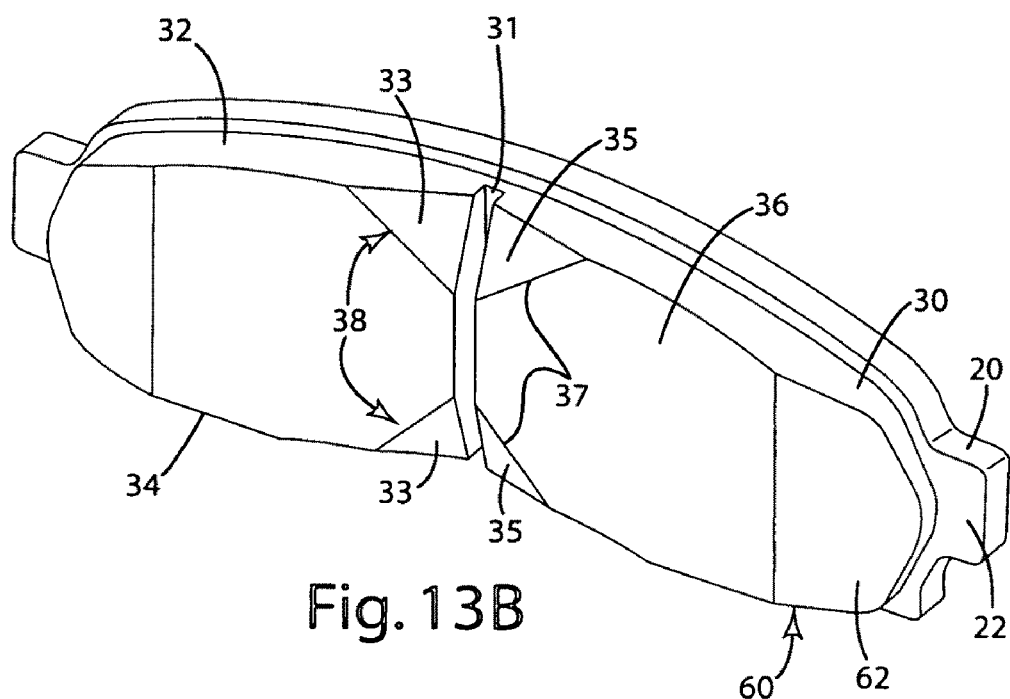
FIG. 13B is a perspective view of the disc brake pad of FIG. 13A having common inner and outer pads after being modified with relieved portions in accordance with the invention.
Figure 14A:
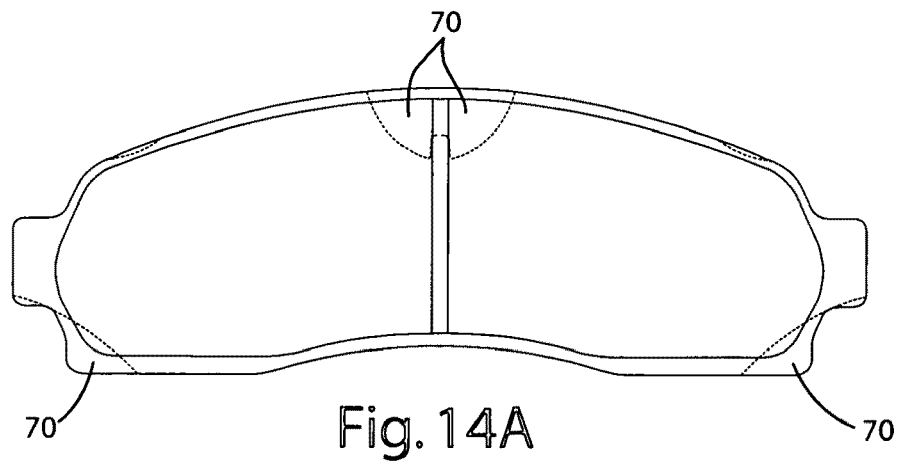
FIGS. 14A-14D are computer generated graphic images of some of the primary out of plane mode shapes from the normal mode analysis, including, targeted mode shapes for the brake pad of FIG. 13A at 7.4 kHz (FIG. 14A); 8.6 kHz (FIG. 14B) and 10.9 kHz (FIG. 14C) and 13.4 kHz (FIG. 14D)
Figure 14B:
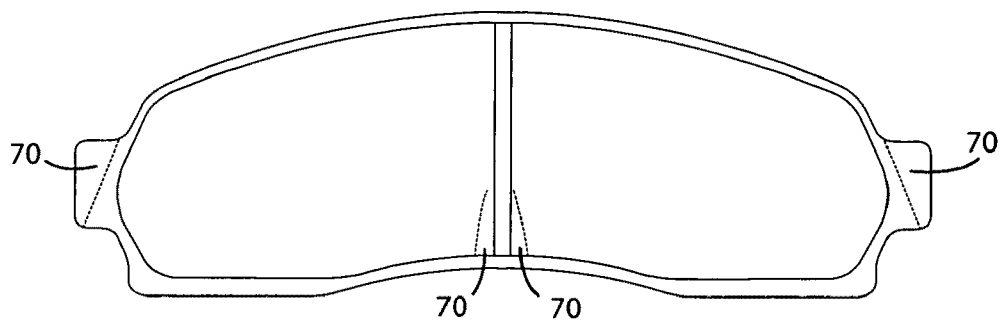
Figure 14C:
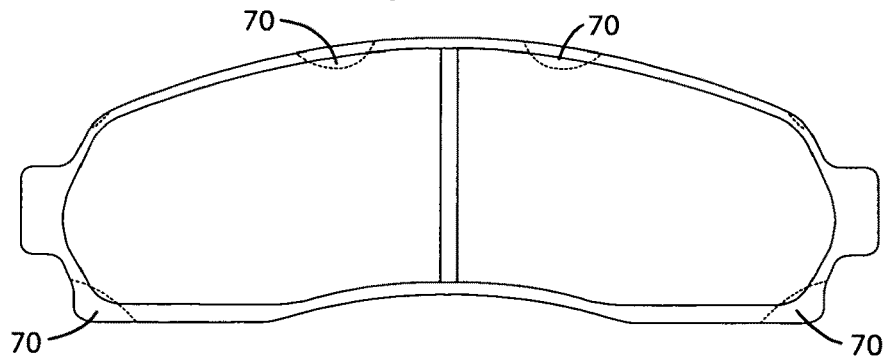
Figure 14D:
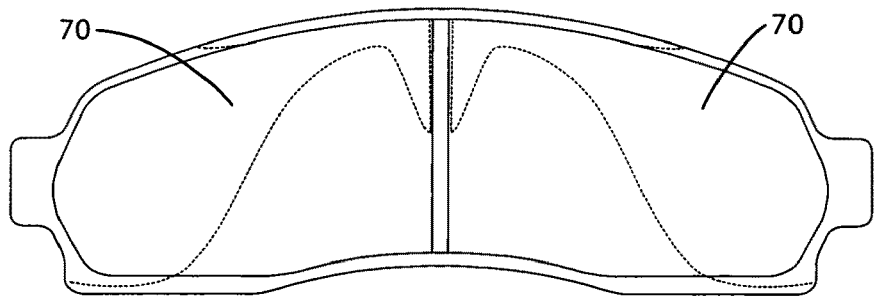
Figure 15:
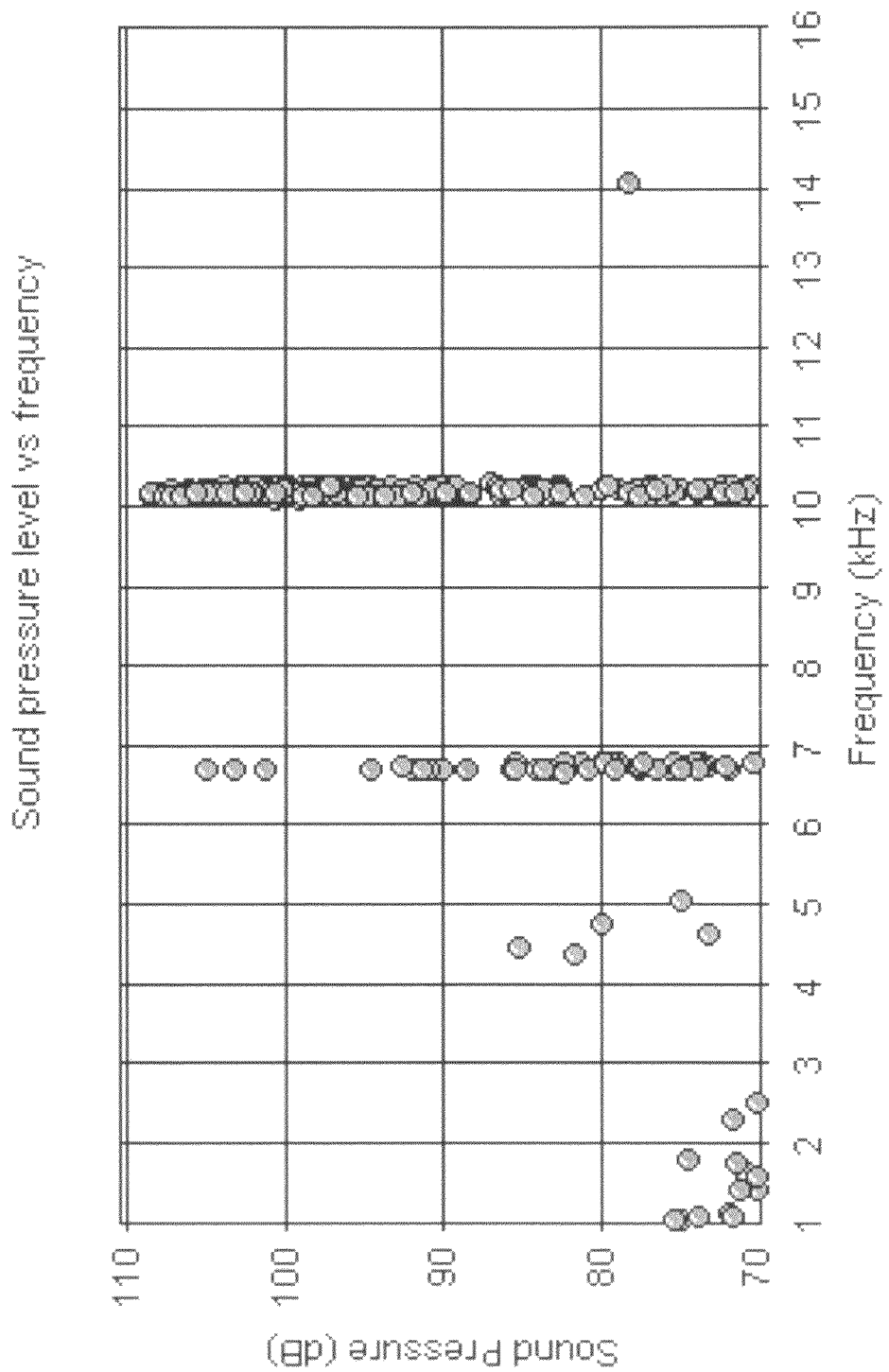
FIG. 15 is a graph of brake squeal event measurements from dynamometer tests on the disc brake pad having the design illustrated in FIG. 13A.
Figure 16:
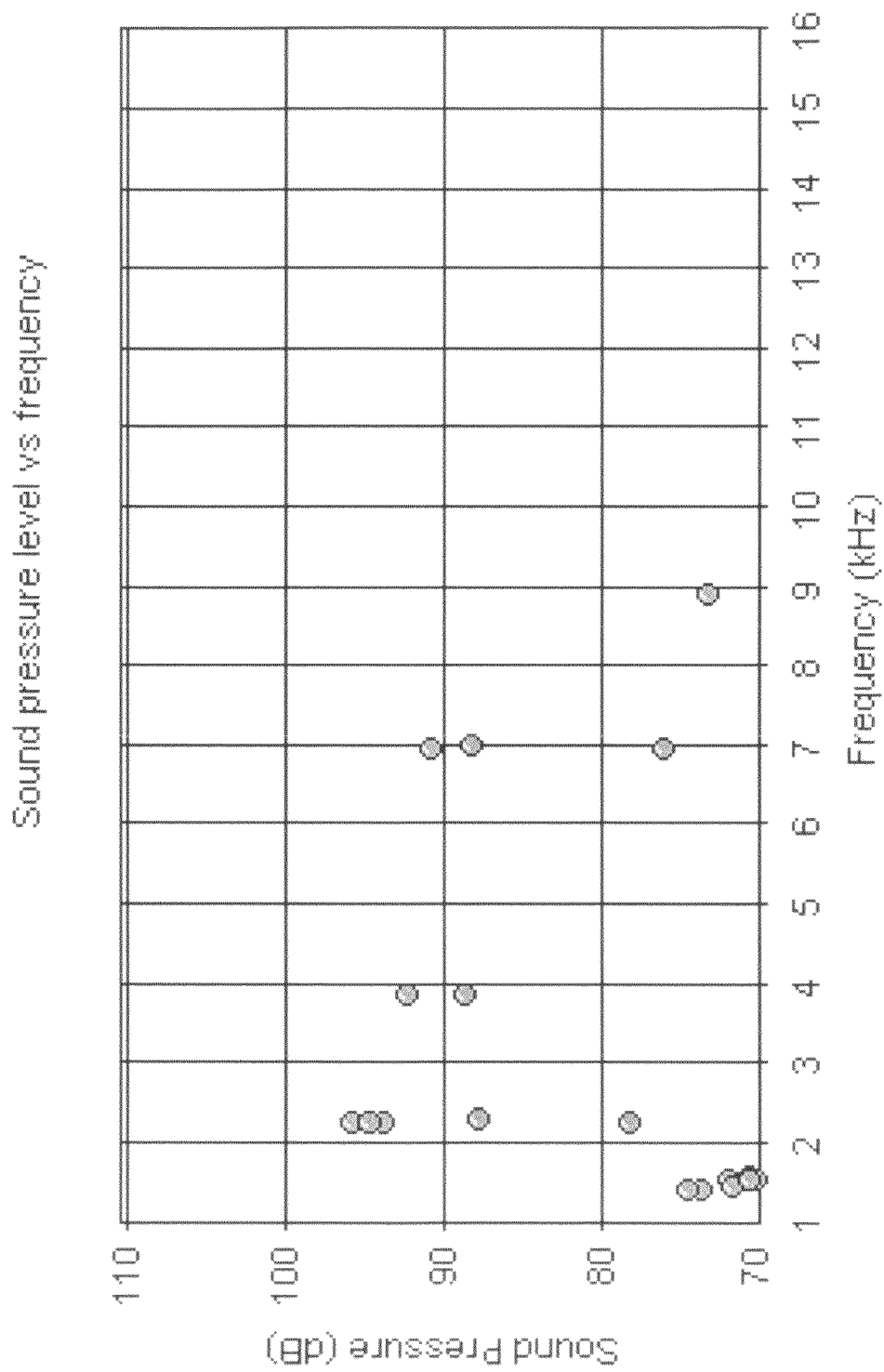
FIG. 16 is a graph of a brake squeal event measurements from dynamometer tests on the disc brake pad having the design illustrated in FIG. 13B.
Figure 17A:
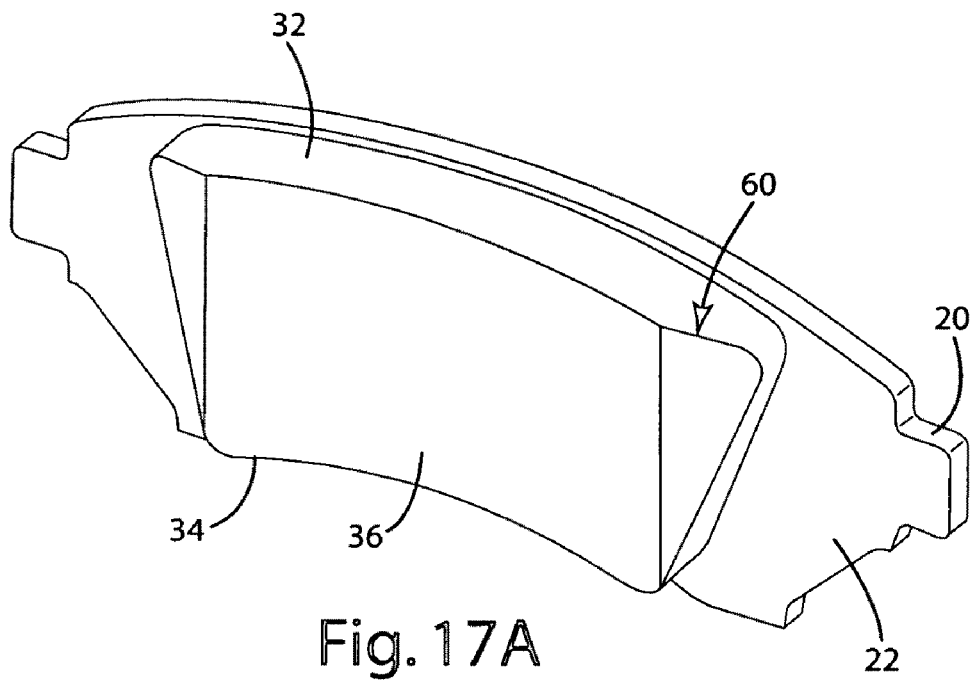
FIG. 17A is a perspective view of a third disc brake pad configuration prior to modification in accordance with the invention.
Figure 17B:
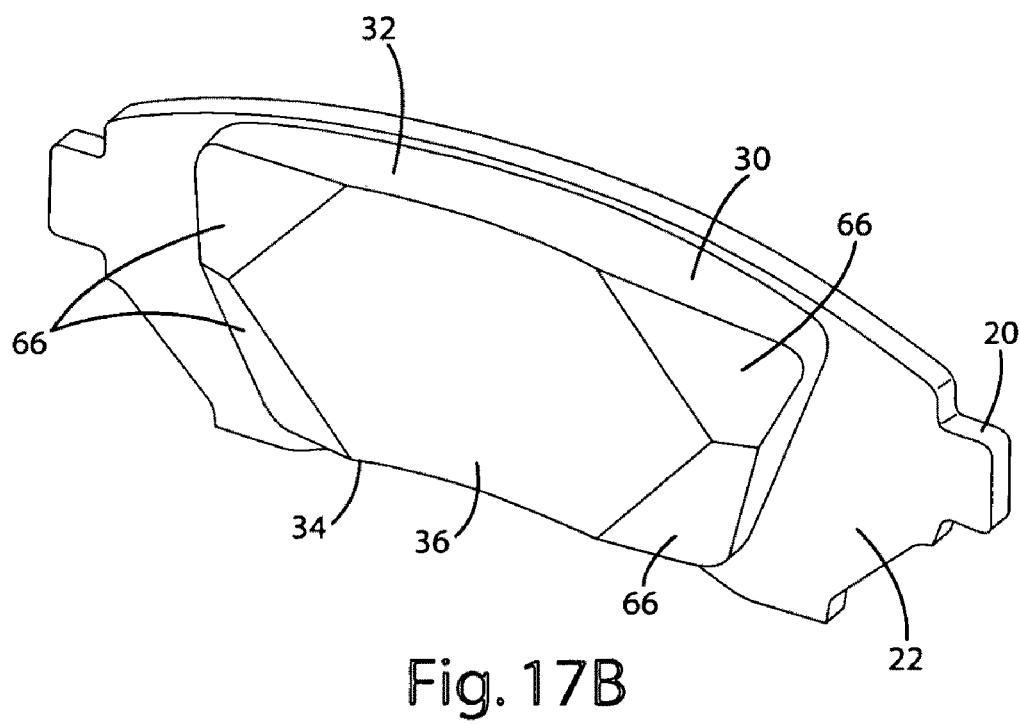
FIG. 17B is a perspective view of the disc brake pad of FIG. 17A modified in accordance with the invention.
Figure 18A:
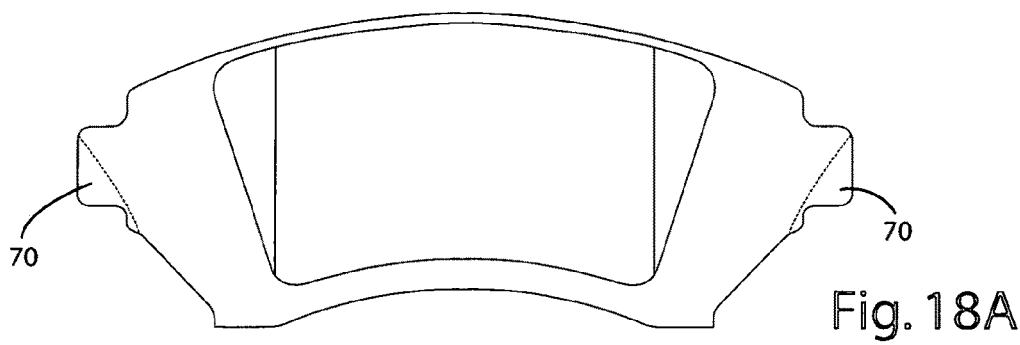
FIGS. 18A-18D are computer generated graphic images of some of the primary out of plane mode shapes from the normal mode analysis including targeted mode shapes for the brake pad of FIG. 17A at 7.0 kHz (FIG. 18A); 9.8 kHz (FIG. 18B); 12.3 kHz (FIG. 18C); 14.0 kHz (FIG. 18D)
Figure 18B:
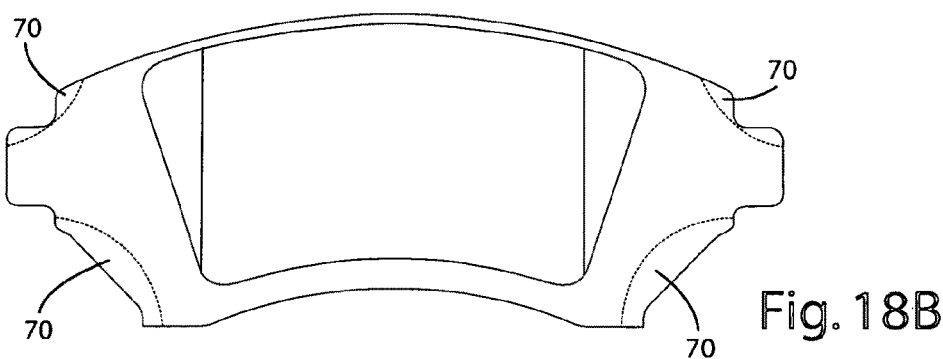
Figure 18C:
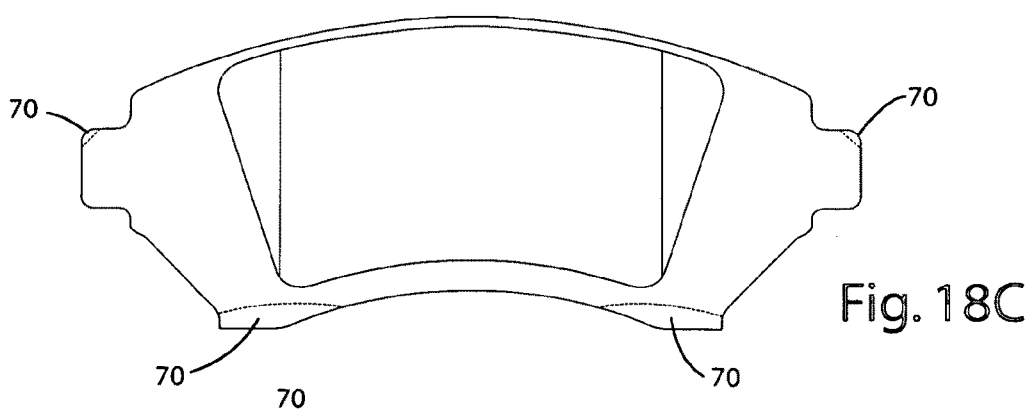
Figure 18D:
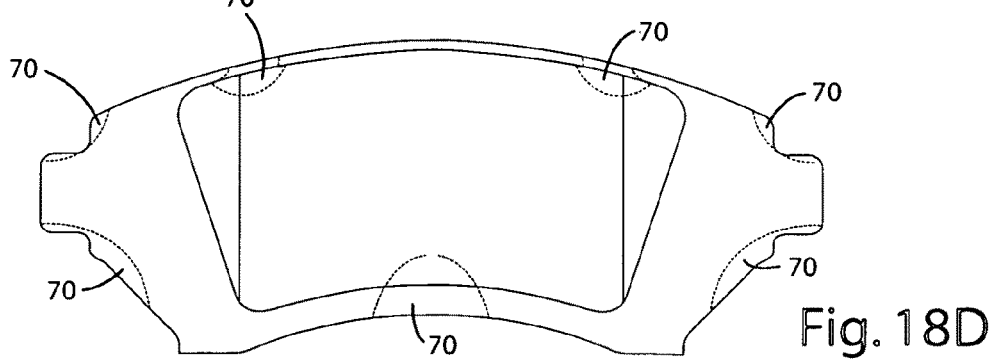

FIG. 13A shows the original pad shape which includes a parallel chamfer 62 center slot 31. FIG. 13B shows the modified pad shape which includes a parallel chamfer 62, center slot 31, and V-chamfers 37 along both the outer edge 32 and inner edge 34. The primary mode shapes are shown in FIGS. 14A-D. Again, the new design is targeting the removal of high amplitude areas 70 (outer edges, center top and bottom) on the lining surface from these modes. Dynamometer test (SAE J2521) results are shown in FIGS. 15 and 16 for the original pad shape and modified pad shape, respectively. The new pad shape completely eliminated squeals at 10.1 kHz and 6.7 kHz.

Example 3

Figure 19:
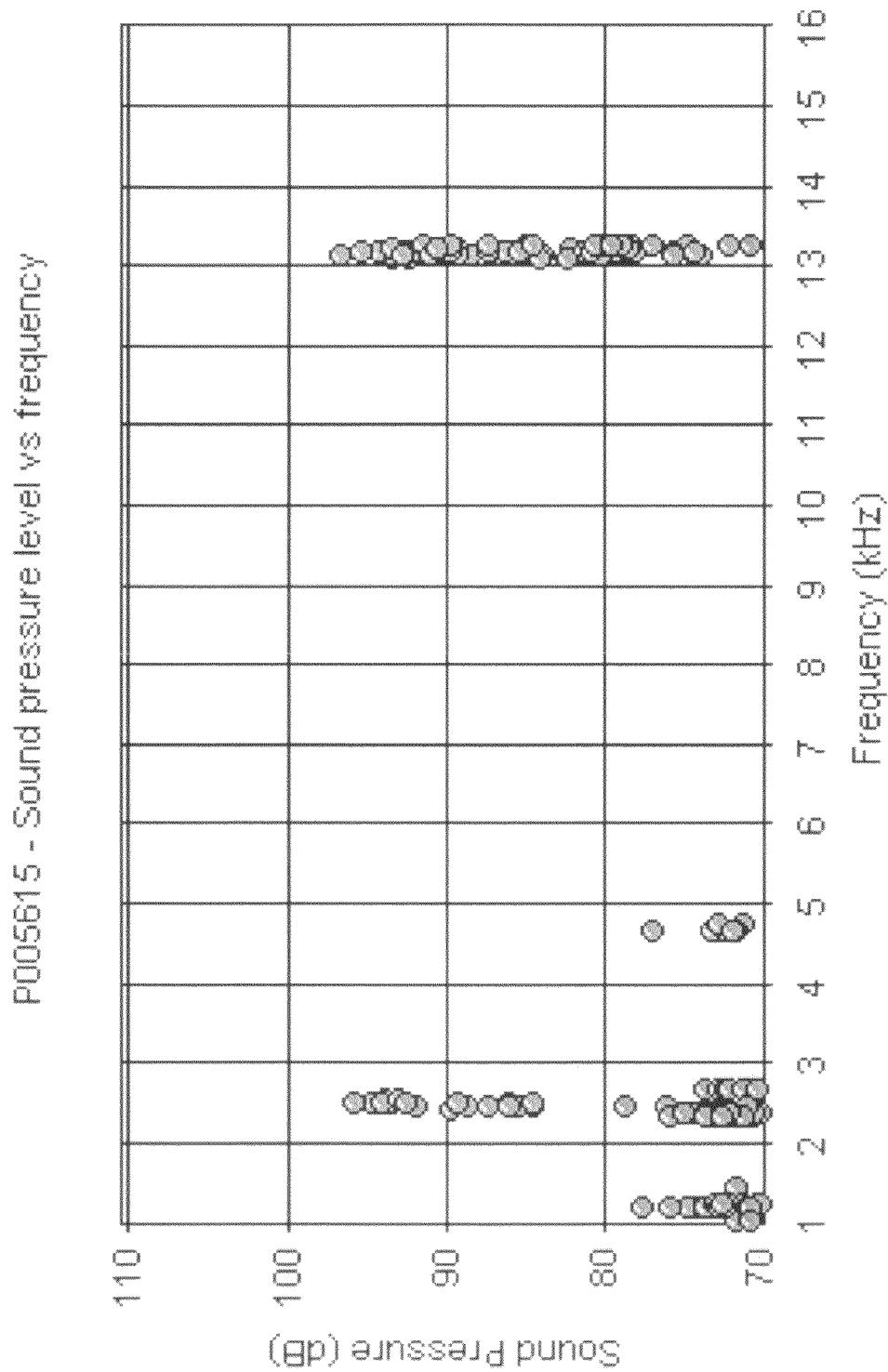
FIG. 19 is a graph of a squeal event measurement from dynamometer tests on the disc brake pad having the design illustrated in FIG. 17A.
Figure 20:
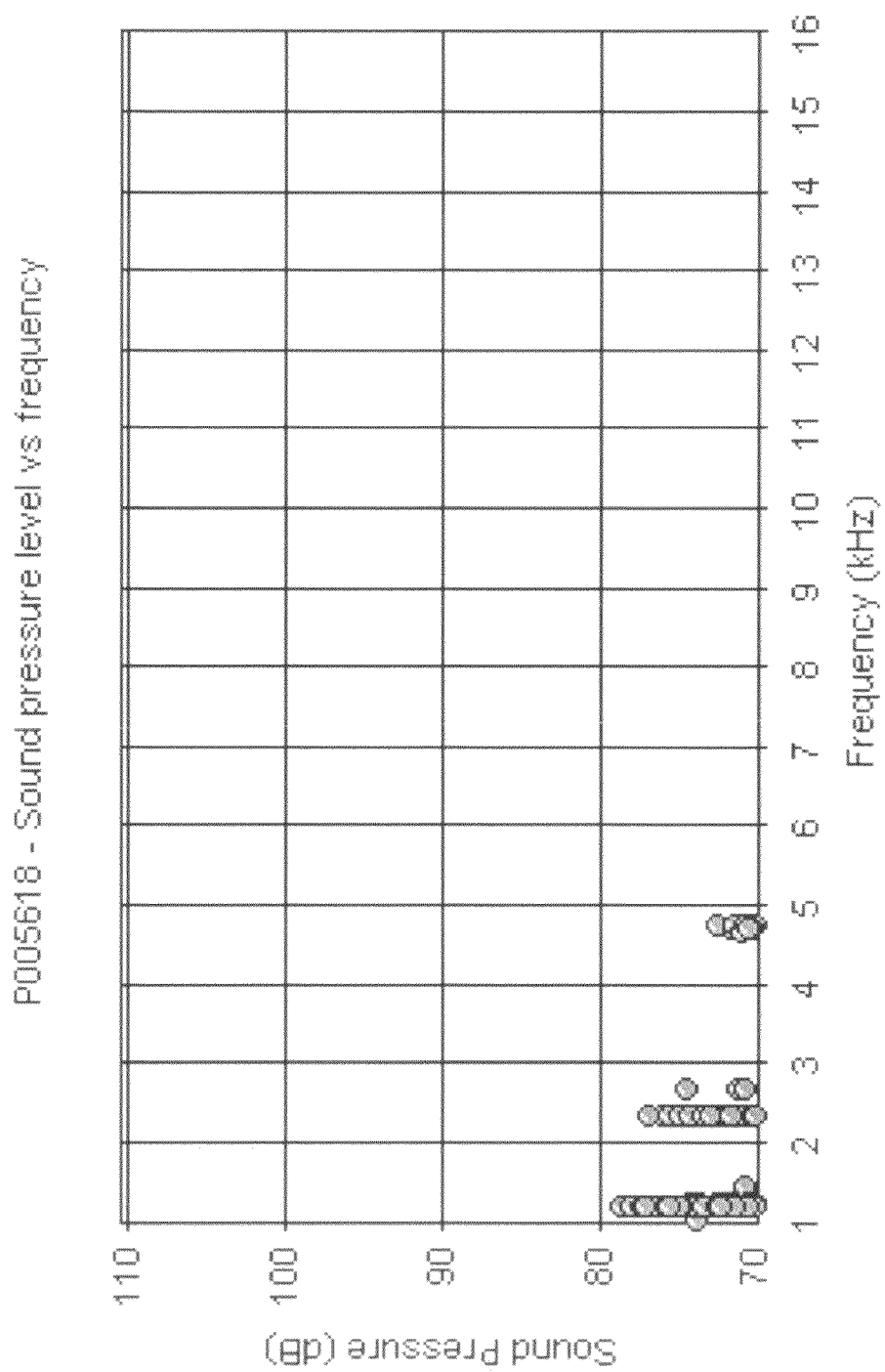
FIG. 20 is a graph of squeal event measurements from dynamometer tests on the disc brake pad having the design illustrated in FIG. 17B.

FIG. 13A shows the original pad shape which includes a parallel chamfer 62. FIG. 13B shows the modified pad shape which includes a diamond chamfer 66. The primary mode shapes are shown in FIGS. 18A-D. The high amplitude areas 70 are outer corners and edges of lining surface. Since the pad profile is more squarely like, cutting a larger parallel chamfer would significantly reduce the lining area, which might create lining life and performance issues. The new diamond chamfer, which preserves lining area over parallel chamfer, was designed to reduce excitation from modes shown in FIG. 18A-D. Dynamometer test (SAE J2521) results are shown in FIGS. 19 and 20 for the original pad shape and modified pad shape, respectively. Again, the diamond chamfer completely eliminated the squeal at 13.2 kHz.

The same design process for alternative pad shapes was executed for fifteen brake applications including the three applications presented above. The alternative pad shapes include parallel chamfer 62, radial chamfer 64, diamond chamfer 66, as well as combinations of regular chamfer 60, slot 31 and top/bottom V-chamfer.

The results from dynamometer tests (SAE J2521) are listed in Table 1. In addition to the percent of noisy stops above 70 dB, the overall sound intensity (OA dB) is used to assess both the noise occurrences and amplitudes. The overall sound intensity is defined as the sum of sound intensity of all squeal events during the test expressed in dB unit. The overall sound intensity is a better criterion for noise since it captures both the noise occurrence and amplitude.

TABLE 1

Summary of noise performances of 15 brake applications.

| Application | Brake | Vehicle type | Original pad shape | Original noise performance % > 70 dB | OA dB | New pad shape | New noise performance % > 70 dB | OA dB |
|---|---|---|---|---|---|---|---|---|
| MX591 | 1 | Minivan | Slot + 15 mm chamfer | 19.3 | 123.3 | Slot + OD V-chamfer + diamond chamfer & Slot + ID/OD V-chamfer + 20 mm // chamfer | 2.4 | 105.7 |
| MX369 | 2 | Pass car | Outer pad inverted radial chamfer | 19.6 | 122.0 | Inner 25 mm // + OD notch/Outer radial + OD notch | 19.2 | 116.4 |
| MX679 | 3 | Light truck | 9 mm // chamfer | 8.1 | 111.6 | 20 mm chamfer | 1.1 | 95.7 |
| MX818 | 4 | Pass car | 12 mm chamfer | 6.6 | 109.3 | Diamond chamfer | 0.1 | 70.2 |
| MX818 Hybrid | 5 | Pass car | 10 mm // chamfer | 11.5 | 118.8 | Diamond chamfer | 2.1 | 100.7 |
| PD752A | 6 | Pass car | Slot | 12.9 | 113.3 | Slot + ID/OD V-chamfer + Diamond chamfer | 9.3 | 113.2 |
| MX702 | 7 | SUV | Slot (5 mm depth) + 12 mm chamfer | 1.1 | 103.1 | Slot (5 mm depth) + 20-34 mm radial chamfer | 1.3 | 96.7 |
| MX632 | 8 | Light truck | Slot + 12 mm chamfer | 32.5 | 125.4 | Slot + ID/OD V-chamfer + 20 mm chamfer | 12.9 | 119.2 |
| MX249 | 9 | Minivan | Inner: 5 mm chamfer, Outer: 8 mm chamfer | 6.6 | 117.1 | Inner: radial chamfer + ID notch; Outer: radial chamfer + ID/OD notch | 1.2 | 89.0 |
| MX477 | 10 | SUV | 15 mm chamfer | 20.5 | 121.6 | 25 mm // chamfer | 15.6 | 116.4 |
| MX748 | 11 | Pass car | Slot + 15 mm chamfer | 1.0* | 102.7 | Slot + 25 mm chamfer | 0.5* | 82.5 |
| MX833 | 12 | SUV | Slot + 12 mm chamfer | 20.8 | 125.1 | Slot + ID/OD V-chamfer + 20 mm chamfer | 0.8 | 101.4 |
| PD793 | 13 | Minivan | Slot + 15 mm chamfer | 5.0 | 102.0 | Slot + ID/OD V-cut + 20 mm chamfer | 5.4 | 107.6 |
| PD430 | 14 | Pass car | Slot | 13.6 | 113.9 | Slot + 20 mm chamfer | 6.2 | 111.2 |
| PD465 | 15 | Pass car | Slot | 18.7 | 117.5 | Slot + 17 mm chamfer | 4.3 | 107.8 |

It can be seen from Table 1 that improvement on noise performance were achieved for all applications except for Brake #13, which represents a 93% success rate. Significant noise reduction was achieved on 9 applications. Note that for the 5 remaining applications the overall sound intensity was reduced significantly even though the percent of noisy stops only saw minor change, indicating the effectiveness of the new pad shape.

When adding relieved portions 38 or adding or modifying end chamfers 60 in accordance with the invention, it is desirable to maximize the surface area of friction surface 36. With reference to the area of the friction surface 36 of the precursor friction pad, it is generally preferred that the surface area of friction surface 36 of brake pad 10 be about 70% or more of the surface area of the friction surface of the precursor friction pad.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:
1. A method of making a brake pad, comprising the steps of:
   providing a metal backing plate having a front face; and
   attaching a friction pad having an outer edge, an inner edge and a friction surface to the front face of the backing plate, the friction pad having a relieved portion located along a center section of at least one of the outer edge or the inner edge, said relieved portion extending obliquely from said friction surface.

2. The method of claim 1, wherein the step of attaching comprises molding the friction pad and the relieved portion onto the backing plate.

3. The method of claim 2, wherein molding comprises hot molding.

4. The method of claim 2, wherein molding comprises press and cure molding.

5. The method of claim 2, wherein the step of molding the friction pad also comprises molding an end chamfer on at least one of a first end or a second end of the friction pad.

6. The method of claim 5, wherein the end chamfer is molded on both of the first end and the second end.

7. The method of claim 5, wherein the end chamfer is one of a parallel chamfer, a radial chamfer or a diamond chamfer.

8. The method of claim 1, wherein the step of attaching the friction pad and relieved portion comprises steps of:
   forming the friction pad and relieved portion; and
   bonding the friction pad to the backing plate.

9. The method of claim 1, wherein the relieved portion comprises one of a V-shaped chamfer, V-shaped notch and a U-shaped notch.

10. The method of claim 1, wherein the friction pad further comprises an end chamfer.

\* \* \* \* \*